United States Patent
Bona et al.

(10) Patent No.: US 9,129,280 B2
(45) Date of Patent: *Sep. 8, 2015

(54) SECURE SMART CARD SYSTEM

(71) Applicant: X-CARD HOLDINGS, LLC, West Chester, PA (US)

(72) Inventors: John Kenneth Bona, York, PA (US); Mark Allan Cox, West Chester, PA (US)

(73) Assignee: X-CARD HOLDINGS, LLC, West Chester, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/063,722

(22) Filed: Oct. 25, 2013

(65) Prior Publication Data

US 2014/0052630 A1 Feb. 20, 2014

Related U.S. Application Data

(63) Continuation of application No. 13/216,919, filed on Aug. 24, 2011, now Pat. No. 8,594,730, which is a continuation of application No. 13/059,433, filed as application No. PCT/US2009/054275 on Aug. 19, (Continued)

(51) Int. Cl.
*H04B 1/38* (2015.01)
*H04M 11/00* (2006.01)
(Continued)

(52) U.S. Cl.
CPC .......... *G06Q 20/34* (2013.01); *G06K 19/06187* (2013.01); *G06K 19/06196* (2013.01); *G06K 19/07* (2013.01); *G06K 19/0702* (2013.01);
(Continued)

(58) Field of Classification Search
CPC .............................. H04W 4/008; H04W 88/02
USPC ................................................ 455/558, 41.1
See application file for complete search history.

(56) References Cited

U.S. PATENT DOCUMENTS 4,701,601 A 10/1987 Francini et al.
5,412,192 A 5/1995 Hoss
(Continued)

FOREIGN PATENT DOCUMENTS

WO WO2009/082760 A2 7/2009

OTHER PUBLICATIONS

International Search Report and Written Opinion dated Sep. 29, 2009 in corresponding International Application No. PCT/US2009/054275.

(Continued)

*Primary Examiner* — Tilahun B Gesesse
(74) *Attorney, Agent, or Firm* — Duane Morris LLP

(57) ABSTRACT

A smart card usable in magnetic stripe swipe transactions with a transaction terminal configured to read transaction information encoded on a magnetic stripe of a standard transaction card includes a card body, which includes a magnetic stripe emulator for use with the transaction terminal, a smart card chip programmed with at least one transaction application for providing secured data for use in a transaction and dynamic card verification data, a power supply, and a card controller in communication with the magnetic stripe emulator. The card controller is configured to receive the dynamic card verification data and control the magnetic stripe emulator to emit a magnetic field encoded with at least a portion of the secured data and the dynamic card verification data.

20 Claims, 19 Drawing Sheets

Related U.S. Application Data 2009, now Pat. No. 8,814,052.

(60) Provisional application No. 61/090,358, filed on Aug. 20, 2008, provisional application No. 61/090,362, filed on Aug. 20, 2008.

(51) Int. Cl.

| | | |
|---|---|---|
| *G06Q 20/34* | (2012.01) | |
| *G06K 19/06* | (2006.01) | |
| *G06K 19/07* | (2006.01) | |
| *G06K 19/077* | (2006.01) | |
| *G06Q 20/40* | (2012.01) | |
| *G07F 7/08* | (2006.01) | |

(52) U.S. Cl.
CPC ........ *G06K 19/0718* (2013.01); *G06K 19/0719* (2013.01); *G06K 19/0723* (2013.01); *G06K 19/07703* (2013.01); *G06Q 20/341* (2013.01); *G06Q 20/352* (2013.01); *G06Q 20/3574* (2013.01); *G06Q 20/4018* (2013.01); *G07F 7/0846* (2013.01)

(56) References Cited

U.S. PATENT DOCUMENTS

| | | | |
|---|---|---|---|
| 5,623,552 A | 4/1997 | Lane | |
| 5,748,737 A | 5/1998 | Daggar | |
| 6,325,285 B1 | 12/2001 | Baratelli | |
| 6,547,130 B1 | 4/2003 | Shen | |
| 6,769,607 B1* | 8/2004 | Pitroda et al. | 235/380 |
| 7,194,438 B2 | 3/2007 | Sovio et al. | |
| 7,270,276 B2 | 9/2007 | Vayssiere | |
| 7,581,678 B2 | 9/2009 | Narendra et al. | |
| 7,715,593 B1 | 5/2010 | Adams et al. | |
| 7,784,687 B2 | 8/2010 | Mullen et al. | |
| 7,819,321 B2 | 10/2010 | Faith et al. | |
| 7,828,214 B2 | 11/2010 | Narendra et al. | |
| 7,946,501 B2 | 5/2011 | Borracci | |
| 7,954,715 B2 | 6/2011 | Narendra et al. | |
| 7,954,716 B2 | 6/2011 | Narendra et al. | |
| 7,954,717 B2 | 6/2011 | Narendra et al. | |
| 8,015,592 B2 | 9/2011 | Doughty et al. | |
| 8,072,331 B2 | 12/2011 | Narendra et al. | |
| 8,082,575 B2 | 12/2011 | Doughty et al. | |
| 8,083,145 B2 | 12/2011 | Narendra et al. | |
| 8,091,786 B2 | 1/2012 | Narendra et al. | |
| 8,136,732 B2 | 3/2012 | Narendra et al. | |
| 2002/0116330 A1* | 8/2002 | Hed et al. | 705/39 |
| 2003/0057278 A1* | 3/2003 | Wong | 235/451 |
| 2004/0010449 A1 | 1/2004 | Berardi et al. | |
| 2004/0129787 A1 | 7/2004 | Saito et al. | |
| 2004/0133787 A1 | 7/2004 | Doughty et al. | |
| 2004/0179718 A1 | 9/2004 | Chou | |
| 2004/0188519 A1 | 9/2004 | Cassone | |
| 2005/0001711 A1 | 1/2005 | Doughty et al. | |
| 2005/0194452 A1 | 9/2005 | Nordentoft et al. | |
| 2006/0161789 A1 | 7/2006 | Doughty et al. | |
| 2006/0186209 A1 | 8/2006 | Narendra et al. | |
| 2006/0259390 A1* | 11/2006 | Rosenberger | 705/35 |
| 2006/0287964 A1* | 12/2006 | Brown | 705/64 |
| 2007/0189581 A1 | 8/2007 | Nordentoft et al. | |
| 2008/0035738 A1 | 2/2008 | Mullen | |
| 2008/0126260 A1* | 5/2008 | Cox et al. | 705/67 |
| 2008/0148059 A1 | 6/2008 | Shapiro | |
| 2008/0223938 A1 | 9/2008 | Faith et al. | |
| 2008/0314971 A1 | 12/2008 | Faith et al. | |
| 2008/0314994 A1 | 12/2008 | Faith et al. | |
| 2009/0159663 A1 | 6/2009 | Mullen et al. | |
| 2009/0159667 A1 | 6/2009 | Mullen et al. | |
| 2009/0159668 A1 | 6/2009 | Mullen et al. | |
| 2009/0159669 A1 | 6/2009 | Mullen et al. | |
| 2009/0159670 A1 | 6/2009 | Mullen et al. | |
| 2009/0159671 A1 | 6/2009 | Mullen et al. | |
| 2009/0159672 A1 | 6/2009 | Mullen et al. | |
| 2009/0159673 A1 | 6/2009 | Mullen et al. | |
| 2009/0159680 A1 | 6/2009 | Mullen et al. | |
| 2009/0159681 A1 | 6/2009 | Mullen et al. | |
| 2009/0159682 A1 | 6/2009 | Mullen et al. | |
| 2009/0159688 A1 | 6/2009 | Mullen et al. | |
| 2009/0159689 A1 | 6/2009 | Mullen et al. | |
| 2009/0159690 A1 | 6/2009 | Mullen et al. | |
| 2009/0159696 A1 | 6/2009 | Mullen et al. | |
| 2009/0159697 A1 | 6/2009 | Mullen et al. | |
| 2009/0159698 A1 | 6/2009 | Mullen et al. | |
| 2009/0159699 A1 | 6/2009 | Mullen et al. | |
| 2009/0159700 A1 | 6/2009 | Mullen et al. | |
| 2009/0159701 A1 | 6/2009 | Mullen et al. | |
| 2009/0159702 A1 | 6/2009 | Mullen et al. | |
| 2009/0159703 A1 | 6/2009 | Mullen et al. | |
| 2009/0159704 A1 | 6/2009 | Mullen et al. | |
| 2009/0159705 A1 | 6/2009 | Mullen et al. | |
| 2009/0159706 A1 | 6/2009 | Mullen et al. | |
| 2009/0159707 A1 | 6/2009 | Mullen et al. | |
| 2009/0159708 A1 | 6/2009 | Mullen et al. | |
| 2009/0159709 A1 | 6/2009 | Mullen et al. | |
| 2009/0159710 A1 | 6/2009 | Mullen et al. | |
| 2009/0159711 A1 | 6/2009 | Mullen et al. | |
| 2009/0159712 A1 | 6/2009 | Mullen et al. | |
| 2009/0159713 A1 | 6/2009 | Mullen et al. | |
| 2009/0160617 A1 | 6/2009 | Mullen et al. | |
| 2010/0117794 A1 | 5/2010 | Adams et al. | |
| 2011/0280258 A1* | 11/2011 | Klingen | 370/437 |

OTHER PUBLICATIONS

Office Action dated Jan. 22, 2013 in copending U.S. Appl. No. 13/059,433.

Office Action issued on May 24, 2013 in corresponding Chinese National Phase Application No. 200980132605.3.

Supplemental European Search Report and Written Opinion dated Mar. 1, 2013 from corresponding EU Application No. 09808756.2-1958/2324445.

* cited by examiner

Track 1 and Track 2 Format Specifications

Track 1: Up to 79 Alpha 7-bit characters (210bpi)

| | | | |
|---|---|---|---|
| SS: | Start Sentinel | 1 Character | "%" |
| FC: | Format Code | 1 Character | "B" |
| PAN: | Primary Account Number | Up to 18 Characters | |
| CD: | Check Digit | 1 Character | |
| FS: | Field Separator | 1 Character | "^" |
| CC: | Country Code | 3 Characters | |
| NM: | Name | 2-26 Characters | |
| FS: | Field Separator | 1 Character | "^" |
| ED: | Expiry Date | 4 Characters | YYMM |
| SC: | Service Code | 3 Characters | |
| DD: | Discretionary Data | Rest of characters excluding ES and LRC | |
| | PVKI: Pin Value Key Indicator | 1 Character | |
| | PVV or Offset: Pin Verification Value | 4 Characters | |
| | CVV → dCVV or CVC → CVC3 | 3 Characters | |
| | dCVV or CVC3 Indicator | 1 Character | |
| | ATC: Application Transaction Counter | 4 Characters | |
| ES: | End Sentinel | 1 Character | "?" |
| LRC: | Longitude Redundancy Check | 1 Character | |

Track 2: Up to 40 BCD 5-bit (including parity) characters (numeric) (75bpi)

| | | | |
|---|---|---|---|
| SS: | Start Sentinel | 1 Character | ";" |
| PAN: | Primary Account Number | Up to 18 Characters (using only 16 for now) | |
| CD: | Check Digit | 1 Character | |
| FS: | Field Separator | 1 Character | "=" |
| CC: | Country Code | 3 Characters | |
| ED: | Expiry Date | 4 Characters | YYMM |
| SC: | Service Code | 3 Characters | |
| DD: | Discretionary Data | Rest of characters excluding ES and LRC | |
| | PVKI: Pin Value Key Indicator | 1 Character | |
| | PVV or Offset: Pin Verification Value | 4 Characters | |
| | CVV → dCVV or CVC → CVC3 | 3 Characters | |
| | dCVV or CVC3 Indicator | 1 Character | |
| ES: | End Sentinel | 1 Character | "?" |
| LRC: | Longitude Redundancy Check | 1 Character | |

FIG. 9

SECURE SMART CARD SYSTEM

CROSS-REFERENCE TO RELATED APPLICATIONS

This application is a continuation application of U.S. patent application Ser. No. 13/216,919, entitled "Secure Smart Card System", filed Aug. 24, 2011, which is a continuation application of U.S. patent application Ser. No. 13/059,433, also entitled "Secure Smart Card System", filed Feb. 17, 2011, which is a U.S. national phase application of PCT/US09/54275 filed Aug. 19, 2009, which claims priority to U.S. Provisional Patent Application No. 61/090,358, entitled "Biometrically Secured Powered Smart Card," filed Aug. 20, 2008, and to U.S. Provisional Patent Application No. 61/090,362, entitled "NFC Cellphone Companion Card," filed Aug. 20, 2008, the entirety of each of which is hereby incorporated by reference herein.

FIELD OF THE INVENTION

The present invention relates to transaction cards, and more particularly to smart cards and to transaction cards having magnetic stripe emulators.

BACKGROUND OF THE INVENTION

Plastic card fraud has become a significant issue not only in the United States but also worldwide. Fraud levels can be measured in the tens of billions of dollars each year or higher when the various stakeholders that are involved in the losses associated with fraudulent transactions measure their total costs. A merchant loses not only the revenue and profit related to a sale, but the product itself, and possibly higher transaction fees when fraud occurs frequently in its business. A merchant must also incur the costs associated with investigating certain types of fraudulent transactions. Credit card associations like the VISA® and MASTERCARD® associations cover some costs associated with fraud but the credit card issuers incur significantly more costs, including costs associated with refunding the amounts charged to a card holder account, investigating possible fraudulent transactions and issuing new plastic cards if a significant breach of security has been identified. When the total costs of fraud are measured among all the parties involved in financial transactions, the losses are staggering.

Plastic card fraud has also opened up a market for all sorts of fraud detection and educational services. Neural network software to detect and hopefully prevent a fraudulent transaction from occurring costs card issuers and their processors millions of dollars to operate. Educational seminars to teach card issuers, merchants, and card holders on how to better safeguard the information that can be used to commit identity theft and plastic card fraud also cost card issuers millions of dollars. Existing security standards, like the Payment Card Industry (PCI) Data Security Standard, while being excellent network and system security practices also require merchants to take extra measures to safeguard the information they possess and these measures cost merchants millions of dollars to implement. An entire industry has been created to protect the static data used in today's plastic card transactions. All told, billions are spent and still fraud levels continue to increase. These increases are due not only to defective security; rather, plastic card programs continue to utilize static data that, if obtained, can be used to commit plastic card fraud.

Over the years, the industry has continued to layer additional static data on credit, debit, and ATM transaction cards. Pin numbers and card security codes have been implemented to help address specific issues of security but criminals continue to adapt their schemes to steal this information. Social engineering attacks like "phishing" are successful because they can target large numbers of people to obtain this static data. The use of holograms and new logos to help prevent counterfeit cards from being used has added to the costs of plastic cards. The plastic card industry has focused on preventing the use of static data rather than adopting a means of implementing some level of dynamic information into these transactions.

Some in the industry have viewed smart cards as one possible solution to this static data problem. The contact and contactless smart card standards and the hardware integrated into the smart card, the point of sale (POS) device, and the authorization process have adopted methods to include some dynamic data in the transaction authorization process. When implemented on a massive scale, for example the Chip and Pin systems common in Europe, these standards have been effective in the local prevention of fraud. For example, the Chip and PIN system in the United Kingdom is a government-backed initiative to implement the EMV standard for secure payments. In this initiative, banks and retailers replace traditional magnetic stripe equipment with smart card technology, where credit/debit cards contain an embedded microchip and are authenticated automatically using a PIN. When a customer wishes to pay for goods using this system, the card is placed into a "PIN pad" terminal (often by the customer themselves) or a modified swipe-card reader, which accesses the chip on the card. Once the card has been verified as authentic, the customer enters a 4-digit PIN, which is checked against the PIN stored on the card; if the two match, the transaction completes.

This kind of smart card technology has been shown to decrease certain types of fraud, an example being fraud associated with counterfeit cards, but fraud in total has continued to rise. This is due to the fact that smart cards are only implemented on a scale necessary to affect fraud regionally. Criminals can target other regions that still rely on the static information common to the vast majority of plastic cards in circulation or they can perform more "card not present" transactions, as in internet purchases or mail order transactions. Smart cards also suffer from having to continue to support the predominate point of sale reader technology deployed worldwide, i.e., magnetic stripe.

Implementing smart cards on a scale necessary to significantly affect fraud levels requires billions of dollars to be spent by merchants or governments to add the new point of sale readers, update the point of sale software, and add the processing functionality for all stakeholders that deal with financial transactions. There are an estimated 20,000,000 magnetic stripe readers in the field today. Replacing these readers with smart card readers would be a huge investment.

An improved and more cost-effective solution for preventing plastic card fraud is desired.

SUMMARY OF THE INVENTION

A smart card usable in magnetic stripe swipe transactions with a transaction terminal configured to read transaction information encoded on a magnetic stripe of a standard transaction card includes a card body, which includes a magnetic stripe emulator for use with the transaction terminal, a smart card chip programmed with at least one transaction application for providing secured data for use in a transaction and dynamic card verification data, a power supply, and a card controller in communication with the magnetic stripe emulator. The card controller is configured to receive the dynamic card verification data and control the magnetic stripe emulator to emit a magnetic field encoded with at least a portion of the secured data and the dynamic card verification data.

The above and other features of the present invention will be better understood from the following detailed description of the preferred embodiments of the invention that is provided in connection with the accompanying drawings.

BRIEF DESCRIPTION OF THE DRAWINGS

The accompanying drawings illustrate preferred embodiments of the invention, as well as other information pertinent to the disclosure, in which:

FIG. 9 illustrates a data format for Track 1 and Track 2 for a credit transaction;

DETAILED DESCRIPTION

Figure 1:
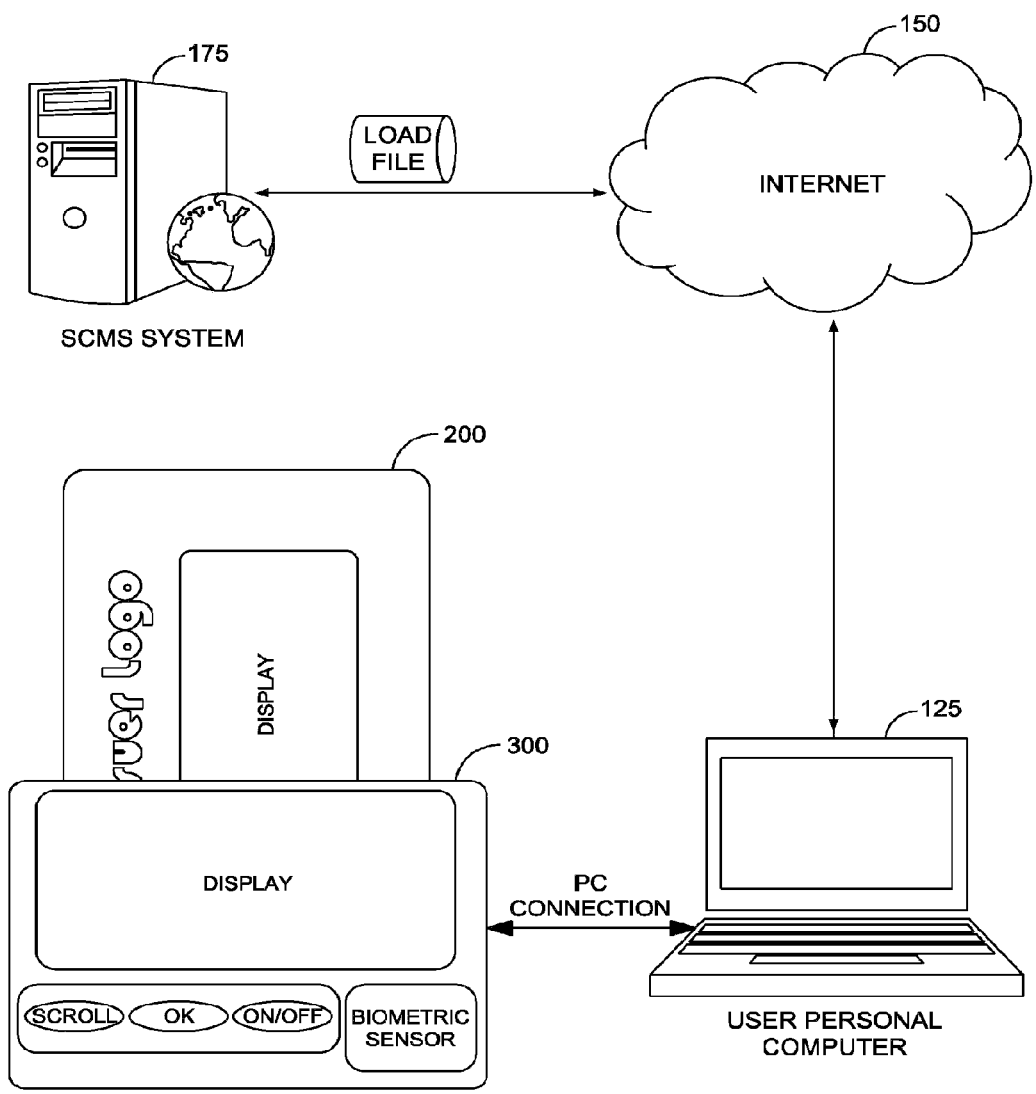
FIG. 1 is a block diagram of a smart card application management system.

This description of the exemplary embodiments is intended to be read in connection with the accompanying drawings, which are to be considered part of the entire written description. In the description, relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description and do not require that the apparatus be constructed or operated in a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise.

In the following description, it is to be understood that aspects of the present invention may be implemented in various forms of hardware, software, firmware, or a combination thereof. In particular, the device modules described herein are preferably implemented in software as an application program that is executable by any suitable microprocessor architecture. The microprocessor architecture includes hardware such as one or more central processing units (CPU), a random access memory (RAM), and input/output (I/O) interface(s), as well as an operating system and microinstruction code. The various processes and functions described herein may be either part of the microinstruction code or application programs which are executed via the operating system.

It is to be further understood that, because some of the constituent system components described herein are preferably implemented as software modules, the actual system connections shown in the Figures may differ depending upon the manner in which the systems are programmed. It is to be appreciated that special purpose microprocessors may be employed to implement the present invention. Given the teachings herein, one of ordinary skill in the related art will be able to contemplate these and similar implementations or configurations of the present invention.

As described in the Background section, massive investments have been made in the estimated 20,000,000 magnetic stripe readers in the field today. Replacing these readers with smart card readers would be a huge investment. Presented herein is are devices, systems and methods that perform secure transactions while making use of the existing magnetic stripe readers and all, or as much as possible, of the existing infrastructure for, for example, financial transactions. More specifically, the embodiments described herein make it possible to implement some dynamic data in transactions utilizing magnetic stripe readers while making it economical for card issuers to distribute this technology to their customers. This approach can serve as an effective safeguard for secured static credit card (or other) information and thus act as a significant tool against fraudulent transactions. The existing standards for magnetic stripe based financial transactions contain regions that can be requisitioned for use with dynamic data. In certain preferred embodiments, a smart card is provided that can support all point of sale (POS) readers, i.e., contact smart card readers, contactless smart card readers and magnetic stripe readers, and deliver dynamic data content through not only the smart card readers but also the magnetic stripe point of sale devices.

Existing smart card specifications for contactless and contact transactions call for the smart card chip to generate some dynamic data for inclusion in the transaction. By way of example only, Visa Inc.'s MSD contactless smart card specifications includes a code designated Dynamic Card Verification Value (dCVV) for each transaction. MasterCard Inc.'s PAYPASS® Magstripes smart card specification has a similar code designated the CVC3. These one-time (i.e., dynamic) codes are generated by the smart card chip and are unique to each transaction. Traditional magnetic stripe specifications for Track 1 and Track 2 contents require a specific static value called a CVV to be present. Replacing the static CVV value with the dynamic dCVV or CVC3 codes (in the embodiments where the data is formatted for VISA® and MASTER-CARD® transactions, respectively) and including any other necessary data used to verify the dCVV or CVC3 codes (e.g., Application Transaction Counter (ATC) value and dynamic data presence flag) would provide sufficient information in the payment authorization process to eliminate both "card present" and "card not present" fraud. Dynamic data generated by a smart card chip for use in authorization of transactions (whether financial, information access or other) are generically referred to herein sometimes as "dynamic card verification data."

As described herein, necessary information for performing secure card not present transactions can be displayed on the smart card display. This information can include the dCVV or CVC3 codes discussed above that are generated by the smart card for use in card present transactions, or other dynamic information, such as a one-time-password (OTP). Companies and organizations such as QSecure of Los Altos, Calif., InCard Technologies of Los Angeles, Calif., RSA Division of EMC Corporation of Bedford, Mass., and OATH (Open AuTHentication) initiative and others have proposed various OTP schemes for inserting a dynamic code into the payment process. The device described below allows for existing smart card standards to be used in the generation and verification of OTP values rather than require card issues to support multiple OTP algorithms.

FIG. 1 is a block diagram of a system 100 for managing applications on a smart card. The system 100 includes a smart card 200, a smart card activation unit 300, which communicates with smart card 200, and a personal computer (or other processor) 125, which is communicatively coupled through a network (such as Internet 150) to Smart Card Management System (SCMS) 175 and locally communicatively coupled to the smart card activation unit 300. Through system 100, a user can manage transaction applications stored on a smart card chip or processor within smart card 200. More specifically, standards exist for managing applications on smart cards. By way of example only, one set of standards is defined by the GlobalPlatform Card, Device and Systems standards promulgated by GlobalPlatform, which is an independent, not-for-profit organization concerned with a standardized infrastructure for development, deployment and management of smart cards. GlobalStandards was founded in 1999 to take responsibility for Visa Inc.'s Open Platform specification, which is one of a number of competing smart card standards including GSM, EMV and OCF.

The GlobalPlatform Card Specification is a secure, dynamic card and application management specification that defines card components, command sets, transaction sequences and interfaces that are hardware-neutral, operating system neutral, vendor-neutral and application independent. The specifications are applicable to any type of application and industry, allowing any combination of applications from any industry on a single card—from mono-application to multi-application. The GlobalPlatform Card Security Requirements Specification provides guidance for selecting card configurations most appropriate to the security policies set up by the card issuer and application providers. Card vendors are also provided with guidance to implement security functions in a consistent manner. Most of the secure elements used in the Near Field Communication (NFC) context rely on GlobalPlatform card specification.

GlobalPlatform also provides a number of specifications for device programming, with different profiles for different industries. The profiles are organized around a common core framework technology and share most of their detailed API's. There are a number of GlobalPlatform specifications relating to the system's infrastructure, developed to standardize back-end systems from personalization to security, key management and application loading. The GlobalPlatform Profile Specification standardizes the interface between the data preparation system and the personalization device utilizing a simple, cost effective, interoperable machine-independent mechanism. Key Management Systems Functional Requirements Specification standardizes the description, or key profile, and procedures around key management, providing an opportunity to deliver centralized key management across separate systems. Communication between various components of the system's infrastructure is standardized via the GlobalPlatform Messaging Specification, which defines all the roles and responsibilities of the actors, or systems, for a multi application smart card infrastructure.

Referring again to FIG. 1, the smart card 200 is shown docked (or otherwise interfaced) with the smart card activation unit 300, which, as described in more detail below, preferably takes the form of a sleeve with a slot for receiving the smart card 200. The SCMS system 175 is a server based application that manages all information necessary to create a Load File. This Load File is the program code and data that are used to install applications on a GlobalPlatform compliant smart card like the Card 200. The user establishes a session to the SCMS System 175 over the Internet 150 and downloads the Load File to the smart card through the connection between the PC 125 and smart card activation unit 300. The smart card activation unit 300 acts as a PC/SC (Personal Computer/Smart Card) compliant device and delivers the Load File to the GlobalPlatform compliant Card Manager running in the Smart Card Chip operating system (e.g. Java Card, Multos, etc.). The Card Manager handles the steps involved in installing the application. All the steps involved in this process are defined by the GlobalPlatform System, Device, and Card standards. The PC/SC specification was developed to facilitate the interoperability necessary to allow Integrated Circuit Card (ICC) technology, also known as smart cards, to be effectively utilized in the PC environment. The PC/SC specification is based on the ISO 7816 standard, and its formal name is "Interoperability Specification for ICCs and Personal Computer Systems."

The use of SCMS system in managing smart card applications is familiar to artisans in the relevant art. Briefly, the user gains access to the SCMS system 175 either through their web banking software or directly by using username/password credentials. The SCMS system presents the user with a list of applications already installed on the user's smart card and a list of applications available for downloading to the smart card. This process is called Post Issuance Provisioning and provides the ability to add or change applications on a smart card after it has been issued to the card holder. The user can select to download a VISA® Credit Card application issued by their financial institution and the SCMS would use other related information to generate the load file, manage a secure communications channel with the smart card and download the load file to the smart card. The SCMS tracks all information about the smart card, e.g., chip identifier, OS, keys, issuer, card holder information and what changes have occurred to the applications on the card. The Global Platform System standard dictates the necessary functionality that is supported by a SCMS system.

Further details regarding use of the smart card activation unit 300, besides its use in managing applications on the smart card 200, such as its use in authenticating that a valid user is performing a transaction and its use in selecting an application (credit, debit, loyalty, access control, etc.) for use in a transaction, are described below, along with additional details regarding the smart card 200.

Figure 2A:
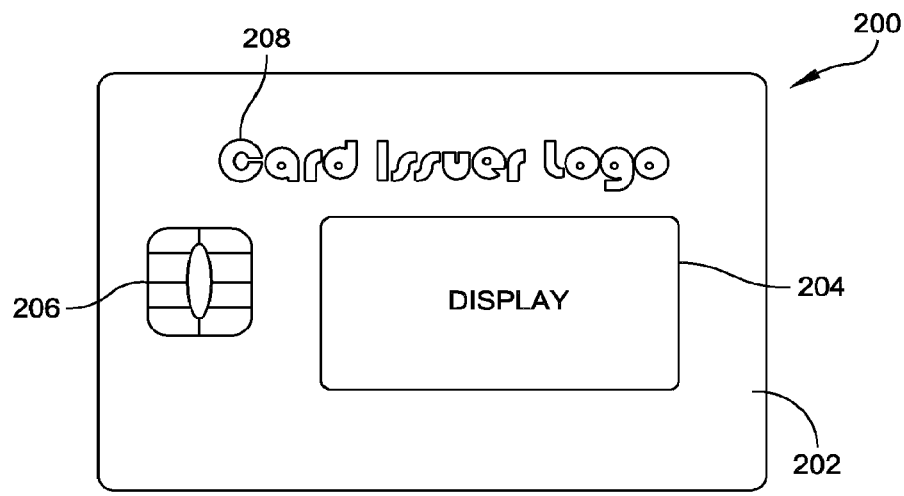
FIGS. 2A and 2B illustrate a smart card according to one embodiment of the present invention.
Figure 2B:
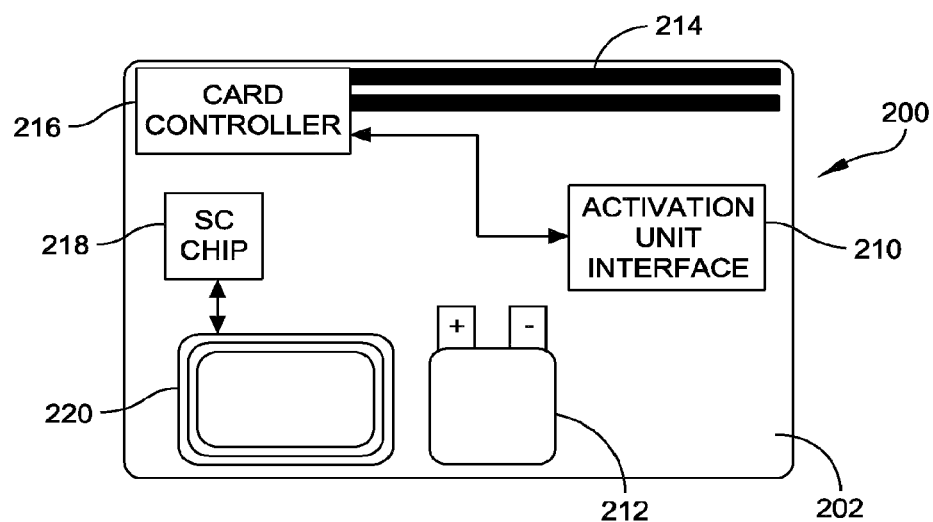

FIG. 2A is a front view of the smart card 200, more specifically the smart card body 202, and FIG. 2B is a schematic illustration of the internal and rear side components of the smart card 200 and smart card body 202. The smart card body 202 takes the shape of a standard plastic magnetic stripe card, as governed by applicable standards. The card 200 may include the logo 208 of the card issuer or other source indicia. In embodiments, the card 200 includes a display 204, such as a LCD display. In embodiments, the display 204 can take the form of electronic paper, also called e-paper or electronic ink display. This display technology is designed to mimic the appearance of ordinary ink on paper. Unlike a conventional flat panel display, which uses a backlight to illuminate its pixels, electronic paper reflects light like ordinary paper and is capable of holding text and images indefinitely without drawing electricity, while allowing the image to be changed later. Examples of e-paper displays include electrophoretic displays, bistable LCD and cholesteric LCD. Smart card contact pad 206 is provided on a surface of the card for contact-based communications between an embedded smart chip and a smart card reader. Smart card contact pad 206 is used to perform transactions on devices supporting the ISO/IEC 7816 standards. In Europe and in Canada this would include the Chip & Pin devices used to perform payment transactions. Contact smart cards are also common in physical access control systems.

Turning to FIG. 2B, the card 200 includes an internal power source 212, such as a battery, for providing power to the various operable components of the smart card 200. Suitable long life batteries for the low power requirements are available. In particular embodiments, the internal power source 212 is a thin film battery, such as the FLEXION™ ultra-thin, flexible lithium polymer battery available from Solicore, Inc. or a lithium thin-film battery available from Varta Microbattery GmbH. In embodiments, a solar panel (not shown) may be provided. Solar cells are connected to a charger and can be used to extend the life of the card beyond that of a conventional battery and/or to recharge the battery. The card 200 includes a conventional smart card chip/processor 218 which communicates with an appropriately configured external smart card reader by way of the smart card contact pad 206 or wirelessly by way of integrated antenna 220 (i.e., contactless communication).

The smart card 200 also includes a smart card controller 216 (i.e., ASIC processor) in communication with an I/O port 210, for communicating with an external source such as the card activation unit 300 (as described in more detail below) and a magnetic stripe emulator 214. Various designs for magnetic stripe emulators are known in the art, some of which are described in, for example, U.S. Pat. No. 4,701,601 to Francini et al., entitled "Transaction Card with Magnetic Stripe Emulator", and U.S. Published Application Nos. 2007/0189581 and 2005/0194452 to Nordentoft et al., both entitled "Credit Card and Secured Data Activation System," the entirety of each of which is hereby incorporated by reference herein. A typical magnetic stripe emulator will include a transducer coil for each magnetic strip track and including a number of coil windings wound around a strip of electromagnetically inducible core material. Each transducer coil is individually inducible by a driver circuit. Instead of an electromagnetic coil, the transducer can be formed from an integrated thin film head. The number of transducer coils may be chosen to three in order to induce secured data signals corresponding to conventional magnetic strip information, which lies in magnetic strips in three tracks, but may as an alternative be provided in numbers ranging from one to more than three. For most applications, data is only to be generated in two transducer coils as shown for emulator 214, corresponding to the first and second tracks of a conventional magnetic strip.

In conventional magnetic strips, the data is permanently magnetically presented to a credit card reader using a so-called F2F-format, or two frequency format, in which a "0" bit is formed by a magnet part of a predetermined length in the magnetic strip, and a "1" bit is two longitudinally, magnetically oppositely directed magnet parts, having a combined length equal to the length of the "0" bit magnet part. Thus, the transducer coils of the emulator 214 preferably emit and present data signals in the F2F-format to a reader, such as a credit card reader, which is to read information from the card 200 with a reader head.

The transducers generate varying magnetic fields that extend beyond the carrier. The transducer coil preferably produce a homogenous and relatively strong magnetic field encoded with the desired data in order for it to be readable by a credit card reader. The nature of this magnetic field is heavily influenced by the transducer coil construction, such as choice of core material and core construction of the cores strips, number and position of the core windings upon the core strips. The design of the emulator 214 based on these factors is within the skill of the artisan in this field. Variations in the signals to a transducer coil generates a variable magnetic field along the strip that is identical to the magnetic field that a reader head is influenced by when a conventional magnetic strip credit card holding the same secured data is passed through the same reader.

The material of the core strip is an electromagnetically inducible material, such as metal, preferably electromagnetic lamination, sheet iron or other sheet metal, either provided as a single or double foil on one or each side of the card body, advantageously having a width and a position corresponding to a conventional magnetic track in order to have a similar magnetic and physical appearance. The choice of core material of the core strips strongly influences the strength and distribution of the magnetic field produced and allows for an enhancement of the magnetic field being produced, resulting in the need for lower current in the core windings, which reduces the power consumption of the card.

The transducer strips of the magnetic stripe emulator 214 are positioned on card 200 in a manner such that alignment with the read sensor of existing reader terminals is facilitated. Current specifications call for the magnetic stripe to be located 0.223 inches (5.66 mm) from the edge of the card, and to be 0.375 inches (9.52 mm) wide. Each track is 0.110 inches (2.79 mm) wide.

The card controller 216 controls all aspects of the functionality of the card 200 that are not provided by the conventional smart card chip 218. The card controller is preferably a separate processor from the smart card chip, thereby enabling the use of the already standardized smart card chip 218. While it is contemplated that in alternative embodiments the functions of the card controller 216 and smart card chip 218 could be merged, such a merged approach not preferred as it is more difficult to implement and would likely face difficulties in meeting EMV certification standards for the device. Further, it should be understood that although card controller 216 is shown as a single processor, its functions or operations could be distributed amongst two or more processors, controllers, drivers, chips or other devices (collectively referred to herein as "controller"). For example, the card controller 216 serves as a driver for managing the display 204. This functionality can be built into a central processor or provided in the form of a separate driver chip. Likewise, the card controller 216 can have built in wireless capabilities for interfacing with antenna 220 to communicate with card activation unit 300, or include a separate wireless communications chip (shown as activation unit interface 210) for exchanging information with the unit 300. In embodiments, activation unit interface 210 is a wireless RS485 chip for implementing wireless communications with the activation unit 300. Alternatively, the interface 210 could be a wired communications interface, such as a RS232 chip. While it is possible to use the contact pad 206, antenna 220, and the smart card chip 218 as the means for communicating with the activation unit 300, this approach would also require that the smart card operating system (OS) be modified to indentify these non-standard communications and intercept and redirect the communications to the card controller 216. This approach would likely be in violation of the EMV standards and thus prevent the device from being certified for use. Using a separate interface 210 for performing communications between the activation unit 300 and the smart card controller 216 leaves the smart card chip 218, smart card contact pad 206 and antenna 220 as a stand-alone system, allowing the smart card 200 to pass EMV certification testing. Although not shown, the card 200 can includes a peripheral communications controller (e.g., SPI bus) for passing information between various components.

The card controller 216 controls the magnetic stripe emulator 214 for transmitting secure transaction data during a transaction, e.g., a credit card swipe transaction. Importantly, this data includes not only standard secured data, such as the static transaction data called for by governing specifications (e.g., account holder name, account number, etc.) but also dynamic information. Using this dynamic information in authorizing transactions prevents fraudulent transactions since the static information alone cannot be used to perform a transaction.

As explained above, the smart card chip 218 is a dual interface smart card (contact and contactless) found in many of the multi-application smart cards available in the market today. There are established standards and standard bodies (e.g., ISO/IEC 7816, ISO/IEC 14443, GlobalPlatform (described above) to name a few) that define this component's functions. These standards provide for secure communications and access to installed applications and data stored in secure memory. As described below, the smart card activation unit 300 communicates with the smart card chip 218 to allow a user to select an active application, queries the application for any necessary information for performing a transaction, and pass some of this information back to the card, specifically the card controller 216 for use in the magnetic stripe emulator 214 and/or display on the card display 204.

In addition to its use in managing applications on the smart card 200, the smart card activation unit 300 is also used during transactions to authenticate that a valid user is performing the transaction and to select what type of card application (e.g., credit, debit, loyalty, access control, etc.) is going to be used in the transaction. These uses are described below but first various features of the smart card activation unit 300 are described in connection with FIGS. 3A and 3B.

Figure 3A:
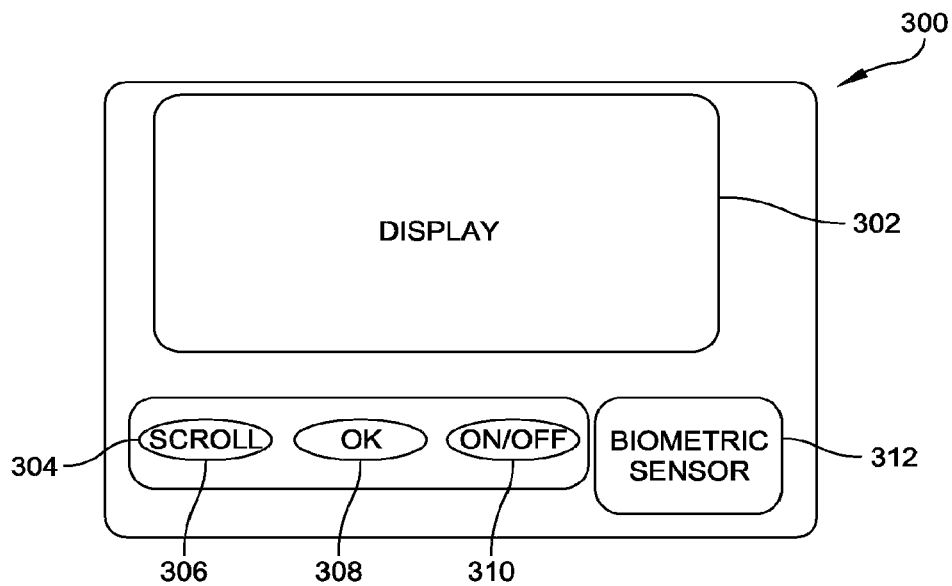
FIGS. 3A and 3B illustrate a smart card activation unit for use with the smart card of FIGS. 2A and 2B according to an embodiment of the present invention.

FIG. 3A is a front external view of the smart card activation unit 300. The activation unit 300 includes a biometric sensor 312, which is preferably a fingerprint reader, and a user interface. In the illustrated embodiment, the user interface includes an input means 304 (e.g., keypad), including various input buttons or toggles, such as "scroll" button 306, "ok" button 308 and "on/off" button 310, and a display 302, such as a LCD display. The on/off button 310 is used to turn the activation unit 300 on and off The scroll button 306 is used to scroll through a list of applications stored on the smart card chip 218 of the smart card 200 and displayed on display 302. A list of names (e.g., "VISA", "MASTERCARD", etc.) or other identifiers corresponding to these applications is displayed on the display 302. The user uses the button 308 to select an active application from the displayed list of applications.

Figure 3B:
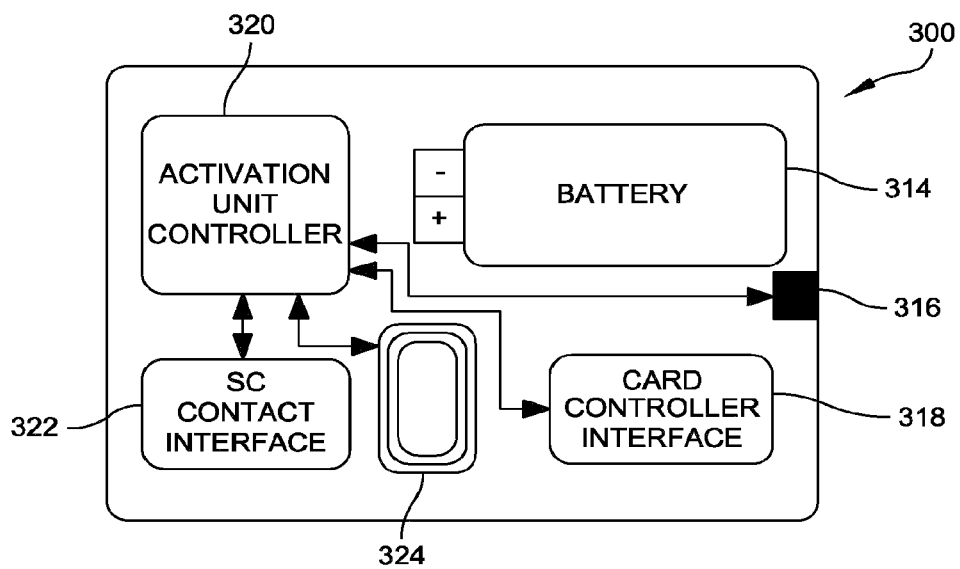

FIG. 3B illustrates the internal components of the activation unit 300. The activation unit includes an activation unit controller 320 that controls and interfaces with the other active components of the activation unit 300. The activation unit includes a smart card interface 322 for contact interfacing with the smart card chip 218 of the smart card 200. In the illustrated embodiment, the smart card interface is a contact based solution (ISO/IEC 7816) and communicates with the smart card chip 218 through smart card contact 206 on the face of the smart card 200. As will be understood by those familiar with smart card communications, the smart card contact pad 206 has eight contact areas to support the communications: c1 is assigned to the supply voltage; c2 is assigned to a reset signal; c3 is assigned to a clock signal; c4 is not used; c5 is assigned to ground; c6 is not used; c7 is for I/O; and c8 is not used. The interface 322 corresponds to these electrical contacts, i.e., provides a physical connection to the pad 206 when the smart card and activation unit 300 are connected. The sleeve controller 320 can also use the contactless standard to communicate with the dual interface smart card chip 218 through the antenna 324. Contactless communication with the smart card chip 218 can be accomplished with either NFC or Standard ISO/IEC 14443 components.

The activation unit also includes smart card controller interface 318 for wired (e.g., RS232) or wireless (RS485) wireless communications with the interface 210 of the smart card 200.

In embodiments, the activation unit 300 includes an internal power source represented as battery power source 314. The battery power source 314 can be a standard rechargeable lithium polymer battery commonly used in cell phones, PDA devices, hand held games and the like. An alternate or additional power source for the activation unit 300 is USB PC connection 316. This PC Connection 316 serves as the means by which PC and Internet based software download content and applications to the card 200 as described above in connection with FIG. 1. PC/SC is the standard for connection and interaction with a smart card acceptance device like activation unit 300. The activation unit 300 can both read and write content to the smart card 200 using established standards like PC/SC and GlobalPlatform Card and Device standards.

When the activation unit 300 is turned on and the smart card is docked with the activation unit 300 (as shown in FIG. 1, for example), the biometric sensor 312 is used to authenticate the user to the smart card 100. In one preferred embodiment, this authentication process is accomplished by a smart card application resident at smart card chip 218 referred to as "Match on Card." Various companies, such as Precise Biometrics of Sweden, Sagem Orga of Germany and others supply this type of application for smart cards for use in access control solutions. The biometric sensor 312 captures a live image of a presented user's fingerprint. The live image is processed by software running on the controller 320 or by a separate processor (not shown) to generate a template from this image data. The sleeve controller communicates with the biometric sensor and transmits the template file through either smart card interface 322 or antenna 324 to the smart card chip 218, specifically to the Match on Card application running on the smart card chip 218. The Match on Card application compares this received live template file with one or more templates that have been previously stored in the smart card chip 218 (or associated memory). The result of the comparison is either a success or failure result. A Success results will allow the user to proceed, and a Failure result will stop any future use of the activation unit until a Success result is achieved. If the user cannot complete this authentication step, the user cannot use the smart card 100 for any transactions. That is, the smart card 200 is not unlocked.

The smart card application that is selected by the user for use is unlocked until the card is placed back into the sleeve. When the sleeve senses the presence of the card it will perform the necessary functions to lock all resident applications. The magnetic stripe 214 of the smart card is in active (transmit) mode until either the completion of a swipe or a timeout has occurred, or when the card is placed back into the sleeve. The timeout length is preferably user definable.

Although the authentication means is shown as a biometric system, other authentication systems may be used. For example, a secure PIN or password can be stored on the smart card chip 218. In this embodiment, the user inputs the PIN or password rather than present a finger to be authenticated.

While the activation unit 300 is shown as a stand-alone device, the activation unit 300 and its functionality can be incorporated into other devices, such as a personal digital assistant or other portable devices such as a cell phone. To the extent this device has Internet capabilities, the device could provide both the activation unit and computer aspects of the system of FIG. 1.

As described in more detail below in connection with the flow diagram of FIG. 8, the sleeve controller 320 uses a card Interface 318 to communicate any necessary information to the smart card for display on the card display 204 and for transmission through the magnetic stripe emulator 214. Application specific information can be displayed for visual verification or other typical plastic card risk management functions like comparing a displayed name against another form of identification. In preferred embodiments, the card interface 318 and card controller 216 communicate via wireless RS-485, but, as explained above, wired communications (e.g., RS-232) with interface I/O 210 can also be used.

Figure 4A:
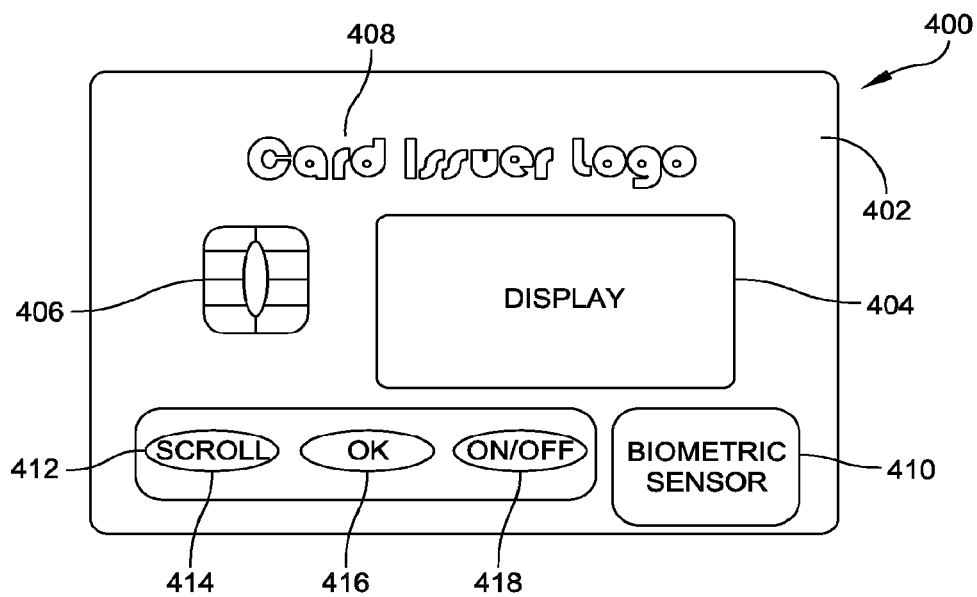
FIGS. 4A and 4B illustrate an alternative embodiment of the smart card of FIGS. 2A and 2B.
Figure 4B:
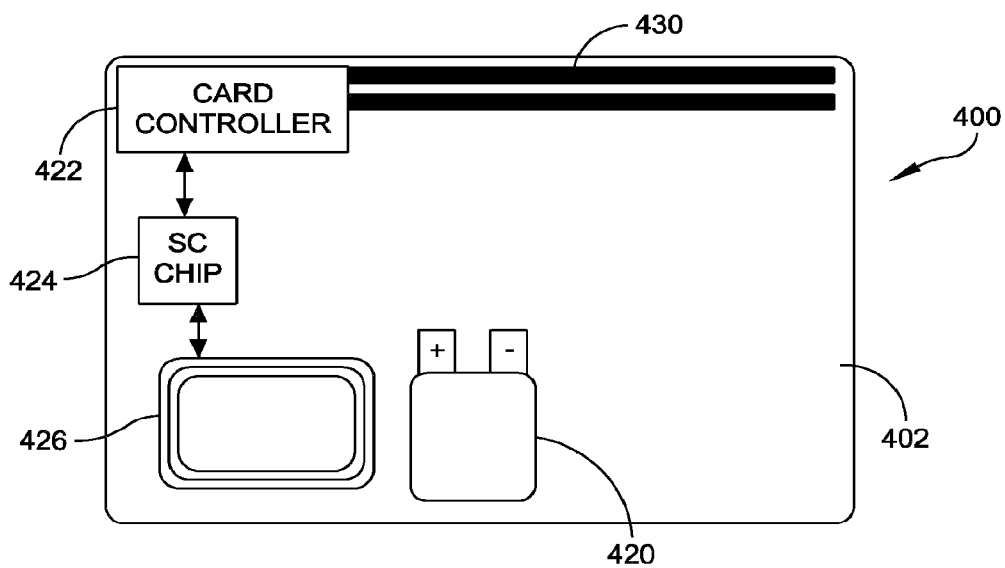

FIGS. 4A and 4B illustrate an alternative embodiment of the smart card 400. In this embodiment, many of the components of the activation unit 300 are incorporated into the smart card 400. The smart card body 402 includes a smart card contact pad 406, an optional logo 408, a biometric sensor 410, and a user interface including a display 404 and a user input keypad 412 including scroll button 414, OK button 416 and on/off button 418. With reference to FIG. 4B, the card 400 includes smart card controller 422, which is coupled to magnetic stripe emulator 430, smart card chip 424 and antenna 426. The card 400 includes an internal battery power source 420.

Figure 5A:
FIGS. 5A and 5B illustrate an alternative embodiment of a smart card activation unit for use with the smart card of FIGS. 4A and 4B.
Figure 5B:
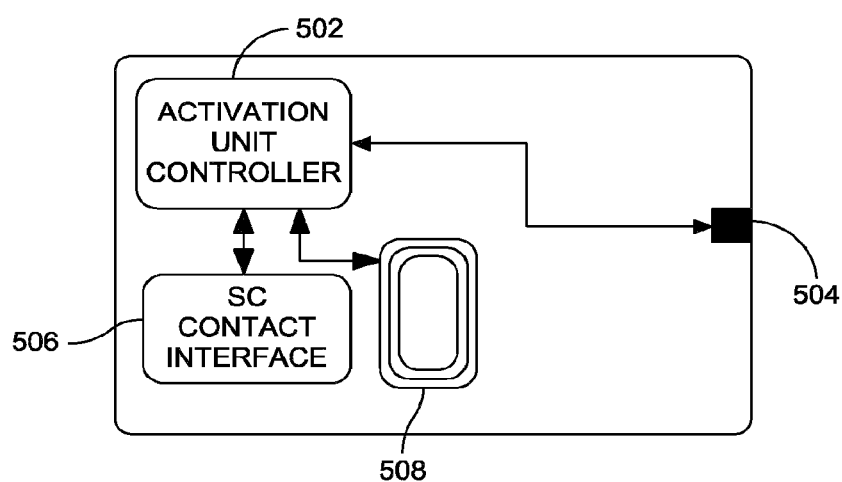

The card 400 can be used with a simplified activation unit 500 illustrated in FIGS. 5A and 5B. In this embodiment, the activation unit 500 includes a sleeve controller 502 and a PC interface 504 and is operable only for managing applications on the smart card chip 424. The sleeve controller 502 communicates with the smart card chip 424 of the card 400 through either contact communications via smart card contact interface 506 (described above) or contactless communications using antenna 508. The activation unit is essentially a standard smart PC/SC card acceptance device for supporting smart cards, such as those devices sold by Advanced Card Systems Ltd. Of Hong Kong, Gemalto (formerly Gemplus) of the Netherlands, Fujitsu of Japan and others. In this embodiment of the smart card 400, the card controller 422 communicates directly with the smart card chip 424 through an interconnect with the smart card chip 424 rather than through the activation unit. The smart card chip 424 must support some form of bus design, like SPI, to communicate with an outside controller chip like the card controller 422.

In use, the user uses keypad 412 to turn on the card 400. As described above in connection the embodiments of card 200 and activation unit 300, the biometric sensor 410 captures a live image and it is converted to a template by appropriate software, which is provided to the Match on Card application resident on the smart card chip 424. A successful match against a previously stored template authenticates the user and activates the card for use. The user then used keypad 412 to scroll through the available applications on the smart card chip 424 and to select one of the available applications for use. Once an application is selected, the controller 422 retrieves the secured static and dynamic data for the application and controls magnetic stripe emulator 430 to emulate this data, thus allowing the smart card 400 to be used with a conventional magnetic stripe reader but with the further advantages of enhanced security and fraud prevention provided by the use of the dynamic data. Of course, the card could also be used with conventional smart card readers. For card not present transactions, the controller 422 controls display 404 to display any necessary information for performing the transactions (e.g., dynamic card verification data such as a dynamic code or one time password or other data).

Figure 6:
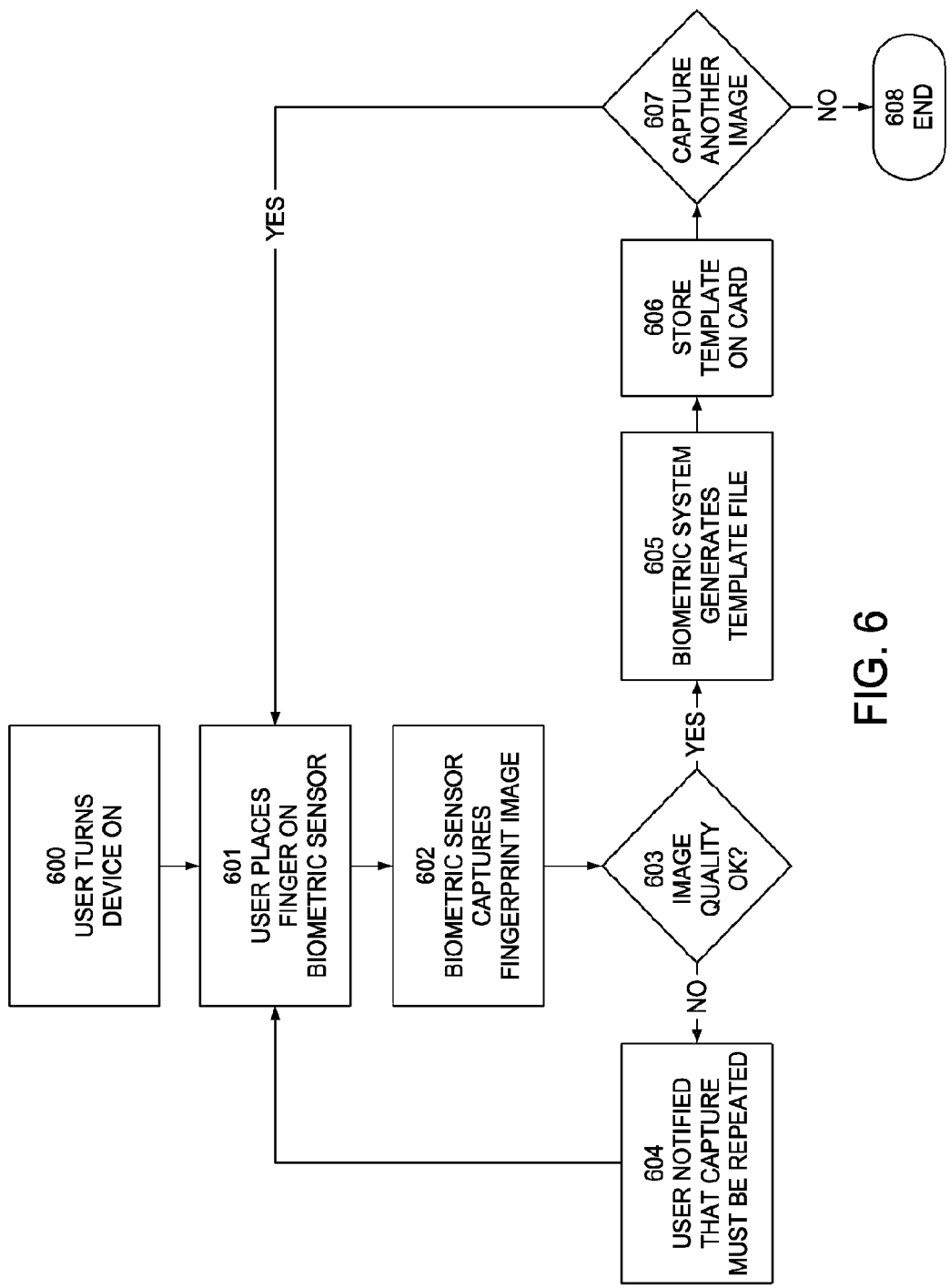
FIG. 6 is a flow diagram illustrating a method of enrolling biometric information on a smart card.

FIG. 6 is a flow diagram of the biometric enrollment process for initializing the smart card 200 with a user's fingerprint template for later use in authenticating the user during transactions. While the method is described in connection with smart card 200, the method is equally applicable to modified smart card 400. This process determines what users can access applications stored on the smart card chip 218.

At step 600, the user docks the smart card 200 with the activation unit 300 and turns on the activation unit using on/off button 310 of the keypad 304.

At step 601, the user places a finger on the biometric sensor 312. In embodiments, this sensor can be a silicon based area sensor or a swipe sensor commonly found on many laptops.

At step 602, the biometric sensor 312 captures the fingerprint image, and at step 603 the image quality is checked to make sure enough relevant points are identified to enable accurate authentication using the fingerprint.

At step 604, if the image quality is not sufficient the user is prompted to repeat the capture step (via display 302) and the process returns to repeat steps 601 to 603.

At step 605, if the image is of sufficient quality (as determined at step 603), the biometric sensor 312 processes the image into a template file of the representative data points.

At step 606, the template is stored in the secure memory of the smart card chip 218, which can be accessed in the future by the Match on Card application of the smart card chip 218.

At step 607, the user is asked if another image should be captured for future comparison. If another image is requested the process is repeated. If no additional images are to be captured the process terminates at step 508.

Figure 7:
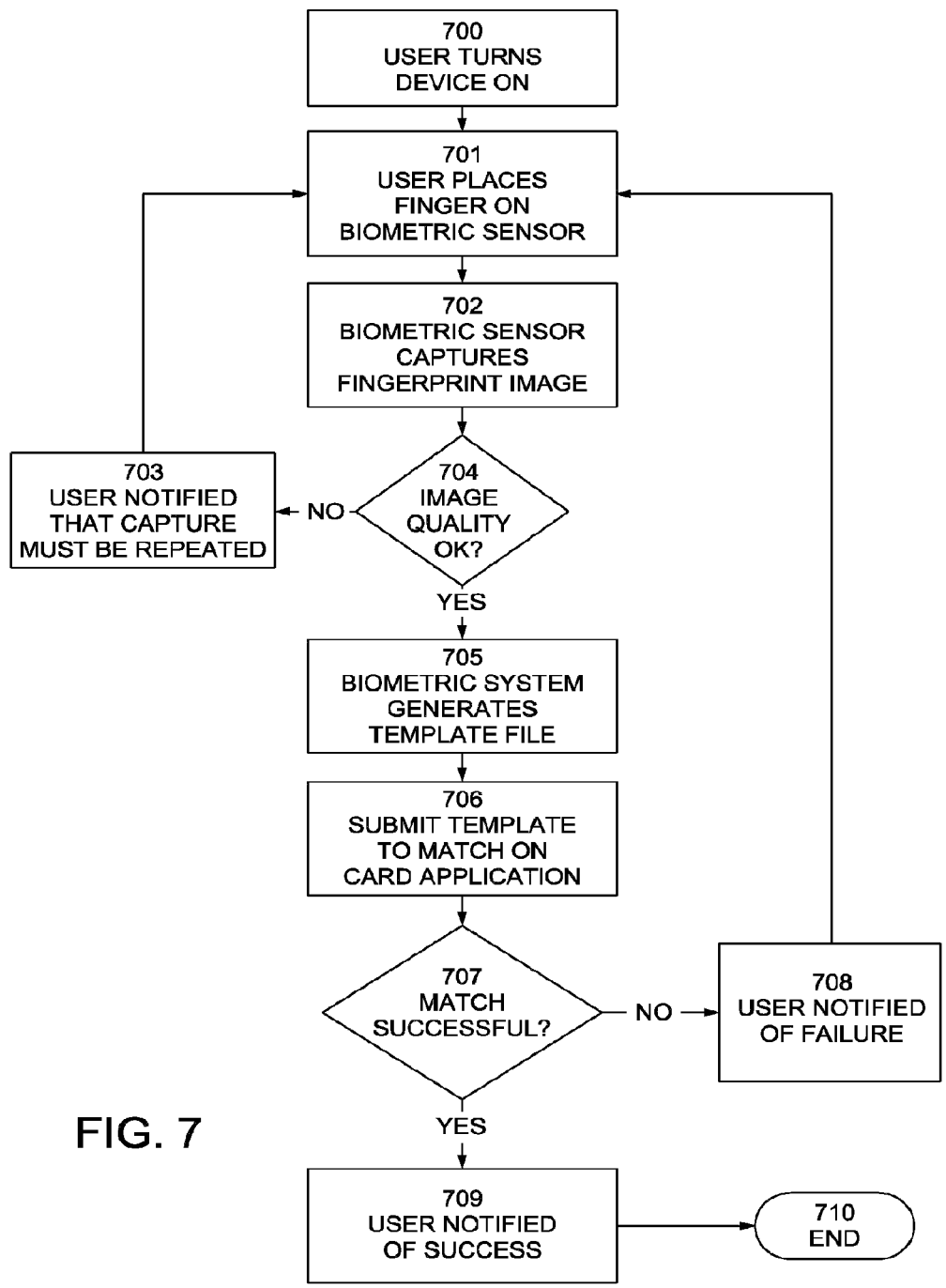
FIG. 7 is a flow diagram illustrating a method of authenticating a user using biometrics.

FIG. 7 is a flow diagram of the user authentication process. Assuming biometrics are used for authentication, this process is only used after the user completes the biometric enrollment process described above in connection with FIG. 6.

At step 700, the user docks the smart card 200 with the activation unit 300 and turns on the activation unit using the on/off button 310 of keypad 304.

At step 701, the user places a finger on the biometric sensor 312.

At step 702, the biometric system captures the live biometric image.

At step 703, the biometric system checks the image quality to determine if there are a sufficient number of data points for comparison.

At step 703, if quality is determined to be insufficient, the user is notified at step 704 (through display 302) that the image capture step must be repeated.

At step 705, if the image is of sufficient quality (as determined at step 703), the biometric system processes the image into a template file of the representative data points.

At step 706, the template file is submitted from the activation unit 300 to the Match on Card application of the smart card chip 218 for comparison to the template(s) that were stored during the biometric enrollment process (FIG. 6).

At step 707, the Match on Card application returns a value of success or failure.

At step 708, if a failure to match occurs the user is notified of the result (via display 302), returned to step 701 and prompted to place a finger on the biometric sensor.

Figure 8:
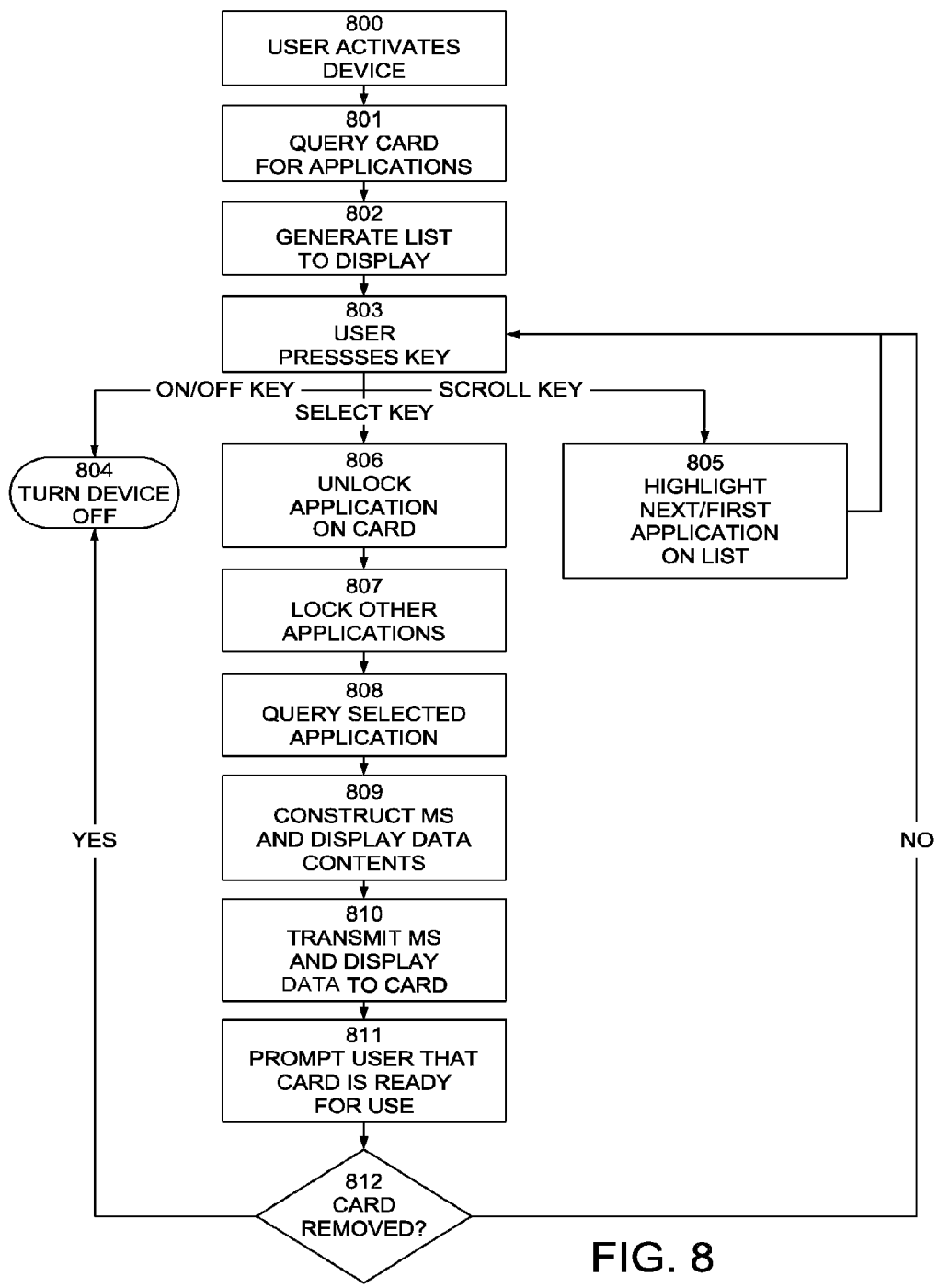
FIG. 8 is a flow diagram illustrating a method of selecting and activating a transaction application on a smart card.

At step 709, if a successful match is determined the user is notified (via display 302) and the process ends (step 710) by sending the user to the application selection process defined in FIG. 8. At this point, the user has been authenticated and the card id active.

While the method of FIG. 7 is described in connection with smart card 200 and activation unit 300, the method is equally applicable to modified smart card 400. That is, the process is performed entirely within the smart card 400 rather than by using the activation unit 300.

FIG. 8 is a flow diagram illustrating an application selection process where an application is selected for use in a transaction and the magnetic stripe emulator of the smart card 200 (or 400) is primed for use in the transaction. The method FIG. 8 follows the user authentication process of FIG. 7.

At step 800, the user successfully activates the device using the method of FIG. 7.

At step 801, the activation unit 300, specifically the activation unit controller 320 through, for example, the smart card interface 322, performs a query of the smart card chip 218 to obtain a list of its installed applications.

At step 802, the activation unit controller 320 generates a list of applications and displays the list on the display unit 302.

At step 803, the user presses a key on the keypad 304.

If the user pressed the on/off key 310 at step 803, the activation 300 unit is turned off at step 804. The function to lock all applications on the smart card is called when the user turns off the card activation unit while card is in the activation unit or when a card is placed back into the card activation unit.

At step 805, if the user pressed the scroll key 306 at step 803, the next item on the list is highlighted. If the user had scrolled to the last application on the list the highlight is returned to the first application on the list and control is passed back to step 803 where the activation unit waits for the next key to be pressed.

At step 806, if the user pressed the ok key 308, the life cycle status of the application selected is changed to "unlocked" and the other applications have their life cycle statuses changed to "locked" (step 807). Application lifecycles and the methods of changing them are defined in the GlobalPlatform Card and other standards discussed above.

Steps 808 to 810 represents steps that enable the use of smart card dynamic card verification data in magnetic stripe transactions. At step 808, the activation unit 300, through its controller 320 acting as a GlobalPlatform device (or other device if another standard is employed) queries the user-selected application from the smart card chip 218 and obtains the necessary data values to be used by the smart card 200 in constructing the magnetic stripe data and any data elements for display on the card display 302. During step 808, any necessary keys are passed from the activation unit 300 to the smart card application to authenticate activation unit 300 as a valid GlobalPlatform (or other) device, according to the applicable industry standard.

At step 809, a mapping algorithm is used by the controller 320 to take the output from the query of the smart card application to format a data stream that is to be emulated by the magnetic stripe emulator 214. This algorithm maps the output of the smart card, which is a given number of data bits representing various data elements of a smart card transaction, to various data elements called for in the applicable magnetic stripe transaction specification for the given transaction application. The activation unit can then create a new data stream in accordance with the transaction application rules for the magnetic stripe transaction, including all of the necessary data elements plucked from the smart card data stream (e.g., user name, account number, etc.) but also including dynamic card verification data. In embodiments, the dynamic card verification data includes: (a) dynamic data code flag; (b) a dynamic data code (retrieved from the smart card data stream); and (c) an incremental transaction number (also retrieved from the smart card data stream). The controller also received any necessary data for display during card not present transactions.

At step 810, the activation unit 300 sends the newly created magnetic stripe data and any display data to the smart card controller 216. The card controller 216 then sends the display data to the display 204 and the magnetic stripe data to the magnetic stripe emulator 214.

At step 811, once all the information is obtained and properly communicated to the smart card from the activation unit 300, the activation unit 300 notifies the user through display 302 that the card can be removed from the activation unit and is ready for use with any card reader (i.e., contact or contactless smart card reader or standard magnetic stripe reader).

At step 812, if the smart card 200 is removed from the activation unit 300 the activation unit 300 is turned off. If the smart card 200 is not removed from the activation unit 300, control is passed back to step 803 and the device waits for another key to be pressed. The removal of the smart card 200 at step 712 is a system level event meaning and at any time if this event occurs, the activation unit 300 is turned off.

The magnetic stripe emulator will stay active for a user definable period of time or until the sensors that form part of the emulator sense a successful swipe past a magnetic read head. The smart card will stay active until the card is placed back into the sleeve.

FIG. 9 is a table illustrating the generally applicable data format specifications for magnetic stripe credit card transactions defined in ISO/IEC 7813. FIG. 9 also illustrates how to change static magnetic stripe data to include some dynamic information for use in a transaction. Tracks 1 and 2 include many fields that are used to allow a card issuer or its agent to authorize a financial transaction. On each track there is a Discretionary Data (DD) segment that allows for the issuer to include some relevant information to use in the transaction authorization process. The typical DD segment includes the static CVV (VISA) or CVC (MASTERCARD) values, which are allotted three characters. Replacing the three character CVV or CVC data with a three digit dynamic code (dCVV in Visa, Inc. terms, or CVC3 in MasterCard, Inc. terms), including the dCVV of CVC3 indicator character (e.g., a status flag indicating that dynamic data is present), and including a four character Application Transaction Counter value allows the card issuer to use a set of data unique to each transaction to authorize a transaction. The smart card chip application in use increments the transaction counter after each transaction from that particular smart card application (i.e., each smart card application maintains its own transaction counter). This value is passed to the transaction server (which is part of the credit card transaction infrastructure in place) during authorization and eliminates the need on the server side to stay in sync as is required by many of today's security tokens.

This approach takes the dynamic code scheme already defined in the specifications for secure smart card transactions, but not for magnetic stripe transactions, and allows for it to be supported in traditional magnetic stripe transactions. Use of this dynamic information in a magnetic stripe transaction allows the same smart card verification algorithms already in place for use with smart card transactions to be reused for magnetic stripe transactions, thereby providing magnetic stripe transactions with the security of smart card transactions through existing magnetic stripe readers. This approach saves a tremendous amount of resources and money by implementing secure transactions through existing magnetic stripe readers already deployed in the field.

It should be understood that the specific scheme described above in connection with FIG. 9, where a CVV or CVC value is replaced with a dCVV or CVC3 value, is specific to only one data specification. The scheme (i.e., particular data format, location of dynamic data, selected dynamic data, etc.) can change according to the card issuer and transaction application. Modifications on data formats clearly fall within the spirit and scope of the present invention. Those familiar with transaction cards will recognize that a number of international organization for standardization standards have been promulgate, e.g., ISO/IEC 7810, ISO/IEC 7811, ISO/IEC 7812, ISO/IEC 7813, ISO 8583, and ISO 4909, for defining the physical properties of the card, including size, flexibility, location of the magstripe, magnetic characteristics, and data formats. These standards also provide the standards for financial cards, including the allocation of card number ranges to different card issuing institutions. These standards will guide the artisan in formatting the secured data and dynamic card verification data for use in a magnetic stripe transaction.

Figure 10:
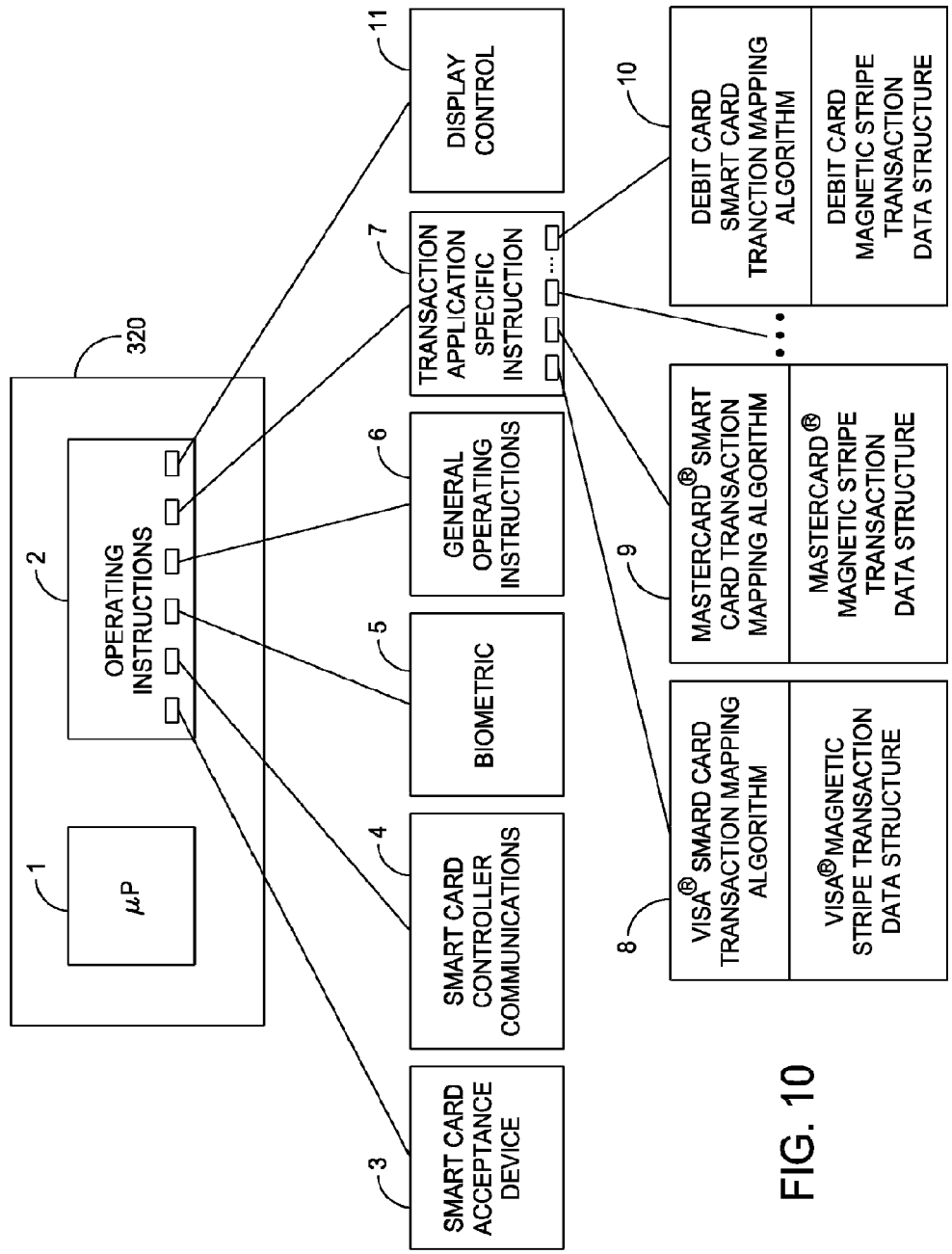
FIG. 10 is a block diagram of controller of the activation unit of FIGS. 3A and 3B.

Magnetic stripes following these specifications can typically be read by most point-of-sale hardware, which are simply general-purpose computers that can be programmed to perform specific tasks. Examples of cards adhering to these standards include ATM cards, bank cards (credit and debit cards including VISA and MasterCard), gift cards, loyalty cards, driver's licenses, telephone calling cards, membership cards, and electronic benefit transfer cards (e.g., food stamps). The approach described herein can be used in nearly any application in which value or secure information is stored on the card itself or even in remote storage. For example, health care information can be stored at a central provider. The user can be issued a smart card as described herein. The smart card would have some secured data, such as an identification of the user and an account number, as well as a smart card chip that can generate dynamic data (e.g., a code and/or transaction number). The user can use the smart card to authorize a doctor or other health care provider to access this secured data (i.e., a transaction) and the backend system would operate in the manner described above to use authorization algorithms with the dynamic data to authorize the transaction (i.e., release of the medical data). FIG. 10 is a more detailed block diagram view of the processing components of the card activation unit controller 320. The controller 320 includes a microprocessor 1 programmed with memory 2 containing its various operating instructions. Memory 2 includes instruction set 3 for enabling the controller 320 to act as a smart card acceptance device. These instructions allow the device to interface with and manage applications on a smart card chip as described above. Instruction set 4 includes instructions for allowing the controller 320 to communicate with a smart card controller 216 of smart card 200. Instruction set 5 is used by the controller 320 in performing the biometric scanning, template formation, etc. operations of the controller. Instruction set 6 includes the general operating instructions of the controller. These operating instructions form the operating framework for the device, including the use of the various other instruction sets in performing the operations and methods described herein, and the like. Operating instructions 2 includes a set of instructions 11 for controlling the display information to the user on the activation unit display 302. Finally, the operating instructions include sets of transaction application specific instructions 7. These instructions are used by the controller 320 in mapping/parsing the smart card transaction data received from the smart card, as described above, and formatting some or all of the data for use in a magnetic stripe transaction. For example, the transaction specific instructions 7 can include a set of instructions 8 that are specific to Visa, Inc. transactions. Instructions 8 include a smart card transaction mapping algorithm that is used by the controller 320 to identify specific data elements in a VISA® smart card transaction data communication received from the smart card chip 218 as well as instructions for constructing a magnetic stripe transaction data structure in accordance the governing specification, including the necessary static data elements and the dynamic card verification data for the magnetic stripe transaction data structure. Other instruction sets, such as instruction set 9, which is specific to MasterCard, Inc. transactions, and instruction set 10 specific to debit card transactions, etc. are also included.

Figure 11:
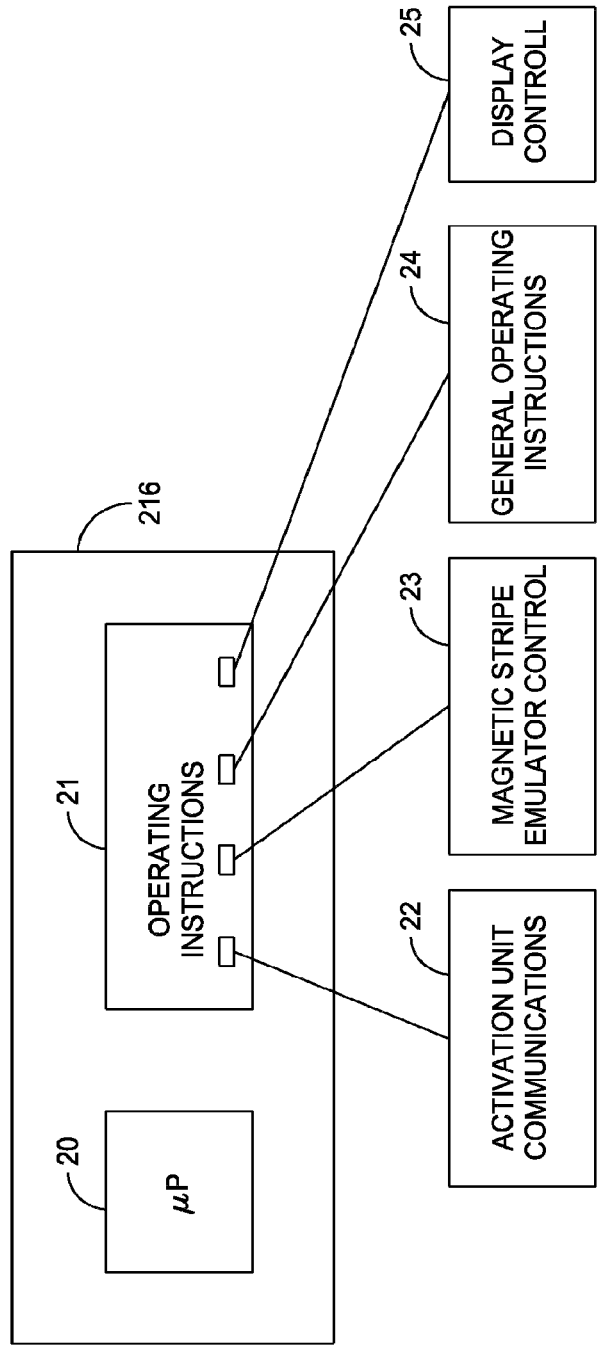
FIG. 11 is a block diagram of the controller of smart card of FIGS. 2A and 2B.

FIG. 11 is a block diagram of the processing components of smart card controller 216. Smart card controller 216 includes a microprocessor 20 programmed in accordance with operating instructions 21. The operating instructions can include, for example, instruction set 22 for managing communications with the activation unit 300. The operating instructions 21 also include an instructions set 23 relating to control of the magnetic stripe emulator 214. The operating instructions include a general set of operating instructions 24 for controlling the overall operation of the device. These operating instructions form the operating framework for the device, including the use of the various other instruction sets in performing the operations and methods described herein, and the like. Finally, operating instructions 21 includes a set of instructions 25 for controlling the display of information to the user on the activation unit display 204.

As described above, smart card controller 422 would incorporate many of the functions performed by activation unit controller 320. That is, in addition to the operating instruction sets described above for smart card controller 216 in FIG. 11, smart card controller 422 can include those instructions sets from FIG. 10 necessary for performing the operations described above in connection with smart card 400.

Figure 12:
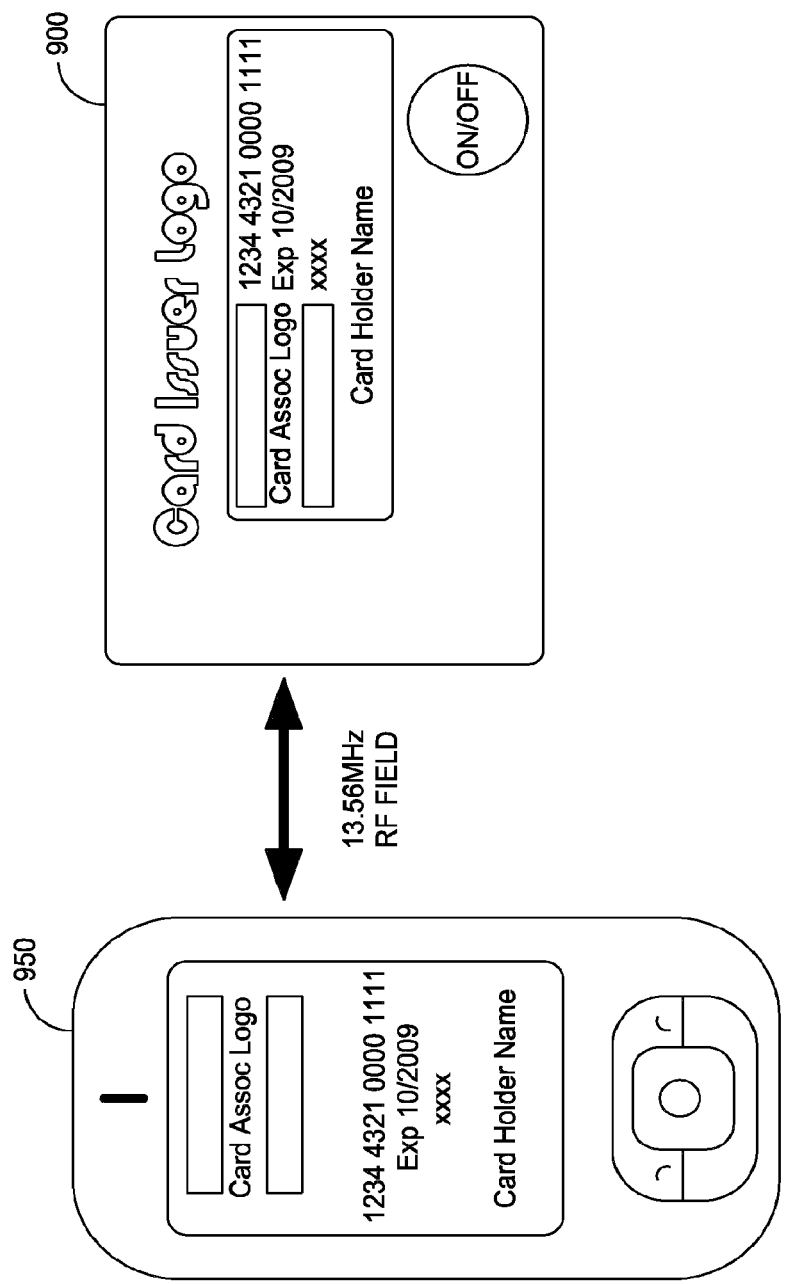
FIG. 12 illustrates an embodiment of the present invention utilizing a cell phone/companion card combination for performing magnetic stripe transactions.

FIGS. 12-20 illustrate an embodiment of a transaction system that utilizes a smart card transaction enabled cell phone or other portable wireless communication device. FIG. 12 shows a short-range communication enabled cell phone 950 in communication with a NFC enabled companion card 900. In embodiments, the short-range communication scheme is Near Field Communication or NFC, which is a short-range high frequency wireless communication technology that enables the exchange of data between devices over about a 10-20 centimeters (about 4-8 inches) distance. As such, the cell phone is enabled for both long range (e.g., cell communications) and short-range communications. NFC is an extension of the ISO/IEC 14443 proximity-card standard (contactless card, RFID) that combines the interface of a smart card and a reader into a single device. An NFC device can communicate with both existing ISO/IEC 14443 smart cards and readers, as well as with other NFC devices, and is thereby compatible with the existing contactless RFID infrastructure already in use for, for example, public transportation and payment. While the transaction system is described herein in connection with NFC communications, it should be understood that NFC communication is only one possible embodiment and other protocol/approaches for short range communications can be used to communicate between devices. The phrase "near field communications" is used herein generically to refer to these short range communications while NFC as an acronym refers to the specific Near Field Communications standard.

In this embodiment, the cell phone 950 is configured for contactless transactions (e.g., contactless credit or debit transactions) using existing NFC techniques. However, existing contactless transaction enabled cell phones cannot be used for magnetic stripe transactions, which is the dominant technology presently in use. In the embodiment illustrated in FIG. 12, the cell phone 950 communicates with the NFC enabled companion card 900 by way of NFC communications. Specifically, in much the same manner described above in connection with the activation unit 300, the cell phone 950 communicates transaction data to the NFC enabled companion card 900 for use in a magnetic stripe transaction using a magnetic stripe emulator. In exemplary embodiments, this transaction data preferably include any necessary static secured data for performing the transaction as well as dynamic card verification data for use in authorizing the transaction. Any necessary data for display on the NFC enabled companion card 900 for use in the transaction can also be transmitted.

Figure 13A:
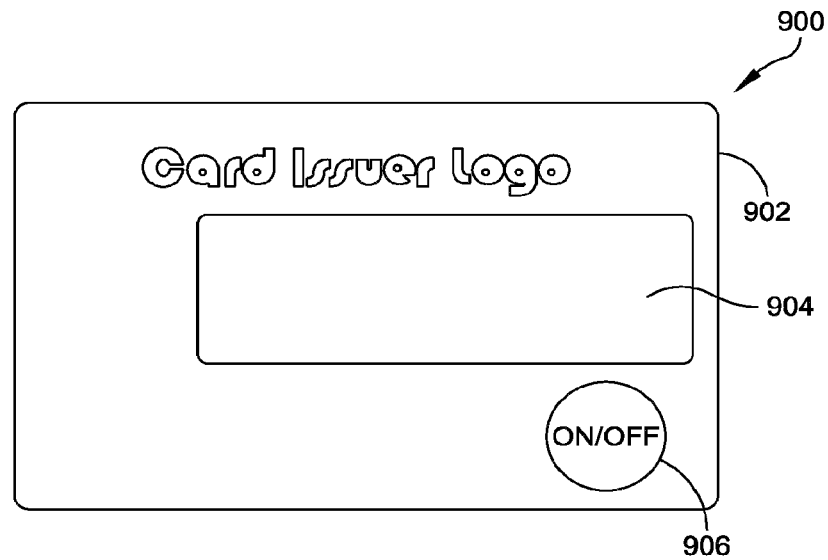
FIGS. 13A and 13B illustrate an embodiment of a NFC enabled companion card for use in the combination of FIG. 12.
Figure 13B:
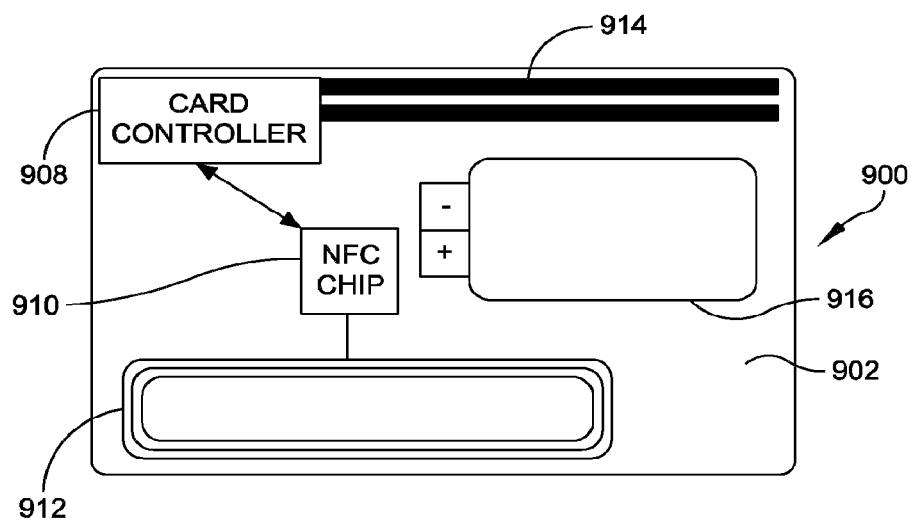

Turning to FIGS. 13A and 13B, FIG. 13A is a frontal view of the NFC enabled companion card 900 and FIG. 13B illustrates the internal and some rear components of the NFC enabled companion card 900. The NFC enabled companion card 900 has a smart card body 902 that is shaped like a conventional credit or transaction card. The smart card includes an on/off button 906 for powering the smart card on/off and a display 904 for displaying information to the user. As with other embodiments of smart cards described herein, the NFC enabled companion card 900 includes a smart card controller (i.e., ASIC) 908 in communication with a magnetic stripe emulator. The NFC enabled companion card 900 also includes an internal battery power source 916 for powering at least the smart card controller 908 and the magnetic stripe emulator 914. The NFC enabled companion card 900 includes a NFC chip (i.e., contactless RF module) that is configured for RF communications via the antenna 912 with another NFC enabled device. While the NFC chip is shown as a separate chip set 910, the NFC functionality can be built into the ASIC that serves as the controller 908. The NFC enabled companion card 900 does not need to include a smart card chip, as the smart card application(s) is/are resident on the cell phone 950.

Figure 14:
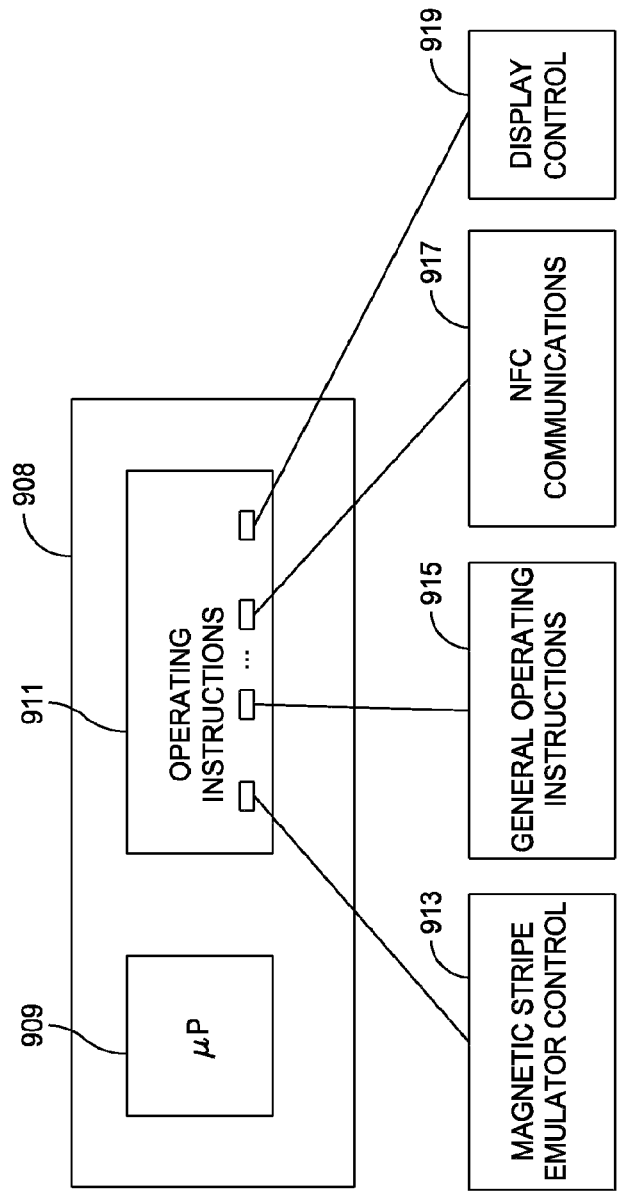
FIG. 14 is a block diagram of the controller of the NFC enabled companion card of FIGS. 13A and 13B.

FIG. 14 is a block diagram of the processing components of smart card controller 908. Smart card controller 908 includes a microprocessor 909 programmed in accordance with operating instructions 911. The operating instructions 911 include, for example, instruction set 913 relating to control of the magnetic stripe emulator 914 and instruction set 917 for engaging in NFC communications with another NFC enabled device. Instruction set 917 interfaces with NFC chip set 910 if the NFC chip set is a separate component from controller 908 or includes the NFC chip set functionality if the NFC communication functionality is incorporated into the controller 908. The operating instructions include a general set of operating instructions 915 for controlling the overall operation of the device. These operating instructions 915 form the operating framework for the device, including the use of the various other instruction sets in performing the operations and methods described herein, and the like. Operating instructions 911 can also includes a set of instructions 919 for controlling the display of information to the user on the display 904.

Figure 15:
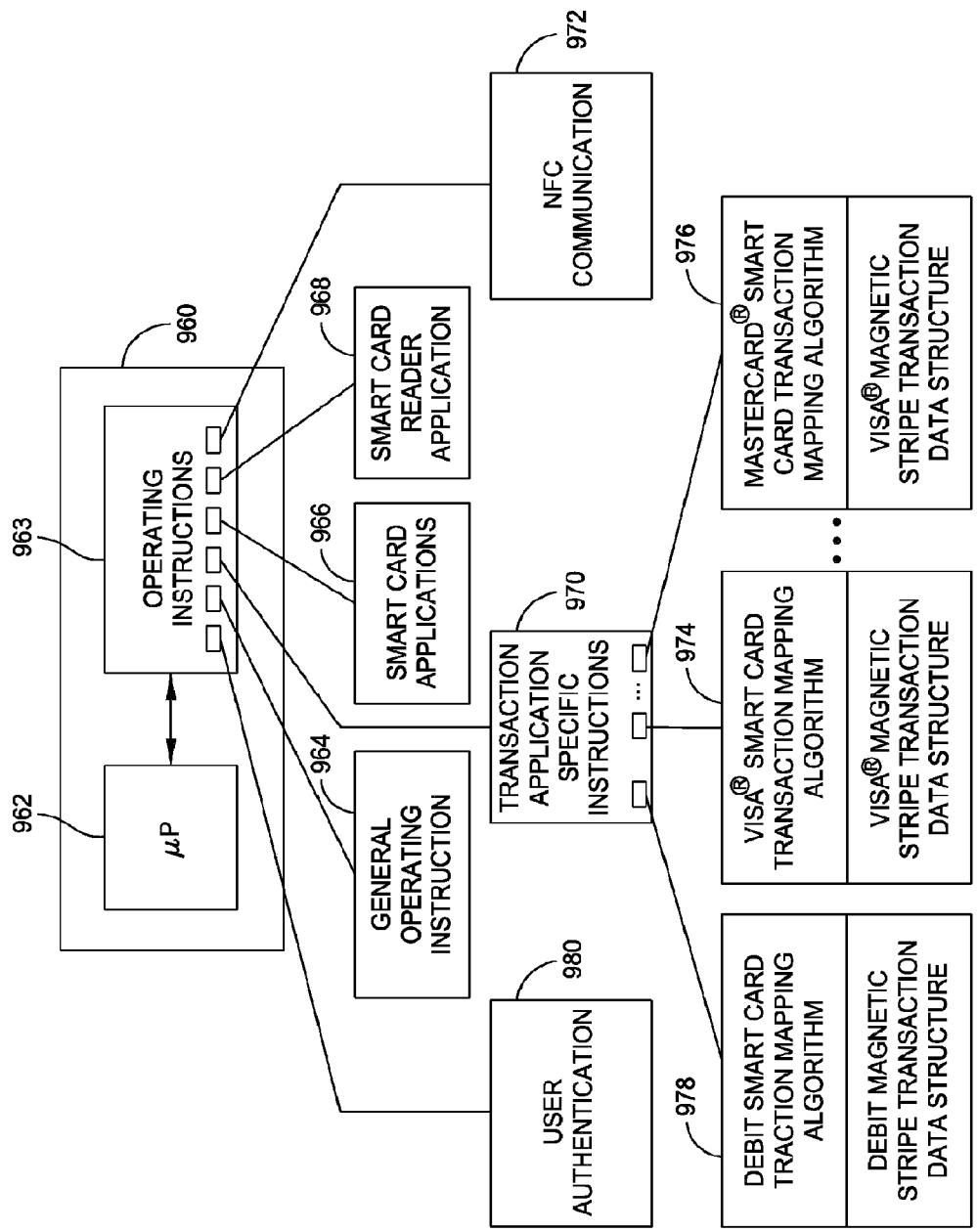
FIG. 15 is a block diagram of the processing components of the cell phone illustrated in FIG. 12.

FIG. 15 is block diagram of the relevant processing components of cell phone 950. It should be understood that only those portions of the processing capabilities pertinent to interacting with the NFC enabled companion card 900 for performing a transaction are described herein. The general processing capabilities of a cell phone, PDA or other wireless communication device for performing its standard operations (e.g., placing a telephone call, communicating via the Internet, email, etc.) are familiar to those in the art of wireless communication devices and are not described herein so as to avoid obscuring the description of the present invention. The cell phone 950 includes a controller 960 that includes a microprocessor 962 programmed in accordance with operating instructions 963.

The operating instructions 963 include a set of general operating instructions 964. These operating instructions 964 form the operating framework for the device, including the use of the various other instruction sets in performing the operations and methods described herein, the display of information to the user on display of the cell phone and the like. Instruction set 966 includes one or more smart card applications 966 for performing contactless smart card transactions, such as by way of NFC communications. These instructions correspond to the VISA® smart card transaction applications, MASTERCARD® smart card transaction applications, debit transaction application, information access transaction, etc. described above as being resident in secure memory of the smart card chips 218, 424 discussed above. These applications 966 initiate transactions using secured data stored in the device, generate dynamic card verification data (e.g., the dCVV code for VISA® transactions and transaction counters) and provide information for display to a user during a transaction. These smart card applications 966 are familiar to those artisans in this field. The operating instructions 963 also include one or more smart card reader applications 968 for communicating with the smart card applications 966. These instructions correspond to the smart card acceptance device instruction set 3 described above and allow the device to interface with and manage smart card applications 966. This application 968 enables the controller 960 to mimic a smart card acceptance device (e.g., a reader) to receive secure communications with the contactless smart card transaction data from the smart card transaction applications 966. By way of example and with specific reference to credit card applications, this "reader" application 966 queries the selected application to return the Track 2 equivalent data. In a Visa, Inc. application, this Track 2 data would include the dCVV and the transaction counter data. Once this data is obtained the "reader" application can provide the data to the transaction application specific instructions 970 (described below) to derive Track 1 data for use in a magnetic stripe transaction. The magnetic stripe transaction data is passed to the NFC communication program 972, which establishes a peer-to-peer session with an in-range NFC enabled companion card 900.

The operating instructions 963 include a set of transaction application specific instructions 970 similar to instruction set 7 discussed above in connection with FIG. 10. These instructions are used by the controller 960 in mapping/parsing the smart card transaction data received from the smart card application(s) 966, as described above, and formatting some or all of the data for use in a magnetic stripe transaction. For example, the transaction application specific instructions 970 can include a set of instructions 974 specific to Visa, Inc. transactions. Instructions 974 include a smart card transaction mapping algorithm that is used by the controller 960 to identify specific data elements in a VISA® smart card transaction contactless data communication from the smart card application 966 as well as instructions for constructing a magnetic stripe transaction data structure in accordance the governing specification, including the necessary static data elements and the dynamic card verification data for the magnetic stripe transaction data structure. Other instruction sets, such as instruction set 976, which is specific to MasterCard, Inc. transactions, and instruction set 978 specific to debit card transactions, etc. are also included.

Finally, the operating instructions 963 can include an instruction set 980 for performing user authentication for transactions. These instructions can be specific to biometric authentication (e.g., biometric scanning, template formation, etc.) or other kinds of authentication, such as user PIN or password authentication.

Figure 16:
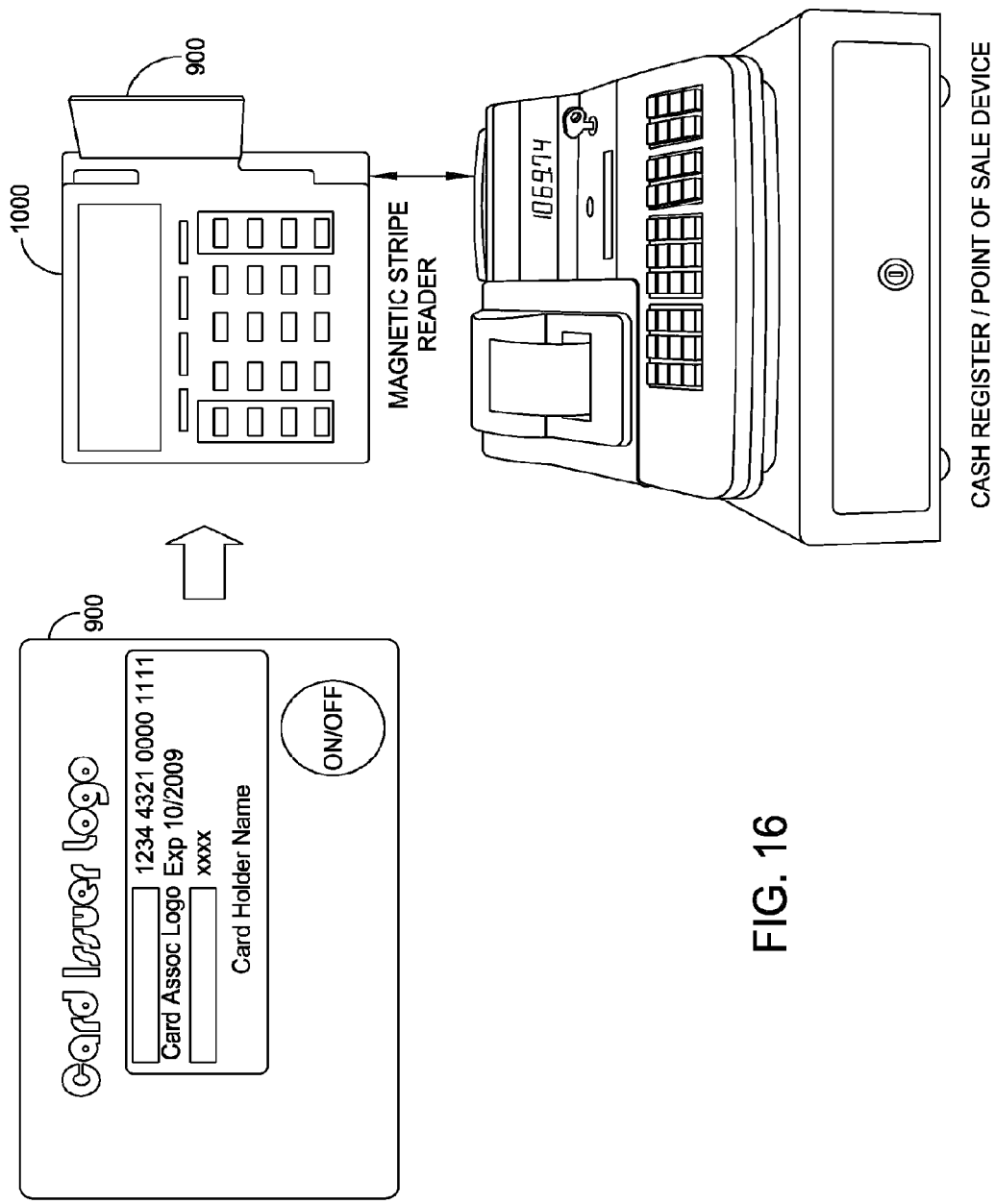
FIG. 16 illustrates a transaction system using the companion card of FIGS. 13A and 13B.

FIG. 16 illustrates the use of the NFC enabled companion card 900 in a transactions, specifically a credit transaction, after the magnetic stripe emulator 914 has been encoded with transaction information. Once the magnetic stripe emulator 914 is encoded with the proper transaction data, the NFC enabled companion card 900 is swiped through a standard magnetic stripe reader 1000 connected to a POS device, such as a cash register 1100. If dynamic card verification data is included in the encoded data, that data is used during the authorization process as discussed above.

Figure 17:
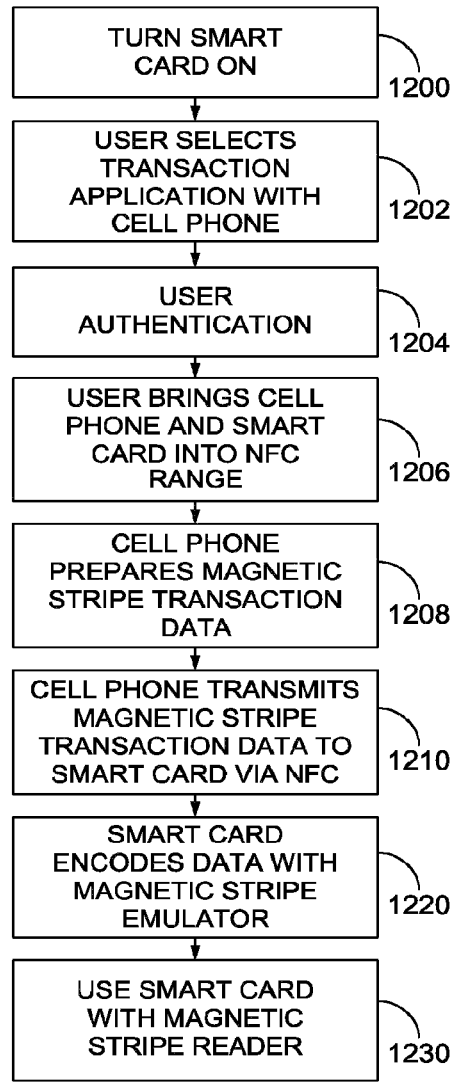
FIG. 17 is a flow diagram illustrating the use of the companion card and cell phone of FIG. 12 in a transaction.

FIG. 17 is a basic flow diagram illustrating a method of using the NFC enabled companion card 900 and cell phone 950 in a transaction. The details of many of the individual steps shown in FIG. 17 are described above in more detail in connection with the flow diagrams of FIGS. 6-8.

At step 1200, the user turns on the NFC enabled companion card 900.

At step 1202, the user uses the cell phone (or other wireless communication device) to bring up a list of transaction applications (e.g., debit, VISA, Inc., MasterCard Inc., etc.) and the user selects one of the transactions for use. During this step, the smart card reader application 968 can query the smart card applications for available applications and the processor 962 displays those applications on the display of the cell phone 950. The user scrolls through the listing and selects an application for use. The cell phone 950 can be programmed with a mobile wallet application that allows the user to select from among the installed applications (credit, debit, others) and enable or activate one for use in the next transaction.

At step 1204, the user is authenticated, such as using biometrics if the cell phone (or smart card) has biometric capabilities or a PIN or password authentication scheme.

At step 1206, the user brings the NFC enabled companion card 900 within NFC range of the cell phone 950 so that they can communicate with one another. Once in range of one another the NFC enabled mobile phone and the smart card establish a peer-to-peer session and pass data to each other. The NFC peer-to-peer session is governed by applicable standards.

At step 1208, the cell phone 950, using transaction application specific instructions 970, prepares magnetic stripe transaction data for use by the NFC enabled companion card 900. As will be understood from the foregoing description, the smart card reader application 968 obtains contactless smart card transaction data from the smart card application(s) 966 and provides that information to the transaction application specific instructions 970 to prepare the magnetic stripe transaction data.

At step 1210, the cell phone 950 transmits the magnetic stripe transaction data to the smart card using NFC communication instructions 972. The transmission of data between the phone and the card can be encrypted according to the established standards covering NFC and ISO 14443 contactless smart cards.

At step 1220, the NFC enabled companion card 900 receives the magnetic stripe transaction data and the smart card controller 908 controls the magnetic stripe emulator to encode the received magnetic stripe transaction data in its magnetic field.

At step 1230, the user is notified (through the display 904 of the NFC enabled companion card 900 and/or the display of the cell phone 950) that the card is ready to use in a traditional magnetic stripe reader. The user uses the smart card with a standard magnetic stripe reader to perform a transaction.

After a successful transaction, at a predetermined time limit or when the user presses the on/off button 906, the NFC enabled companion card 900 deletes any transaction data and is available for use in the next transaction. For security purposes, the NFC enabled companion card 900 retains no useful information related to the transaction.

The cell phone can also be used in conventional contactless smart card transactions. For the VISA® MSD and MASTERCARD® Magstripe smart card specifications this means that the cell phone returns Track 2 equivalent data. The contactless reader application takes Track 2 data and creates Track 1 data since a lot of the information is redundant on the Tracks. The only significant difference in the track data is that the card holder name is on Track 1 but including this information in payment information is sometimes not recommended. The contactless reader then sends this data to the POS system for use in authorizing the transaction.

Figure 18:
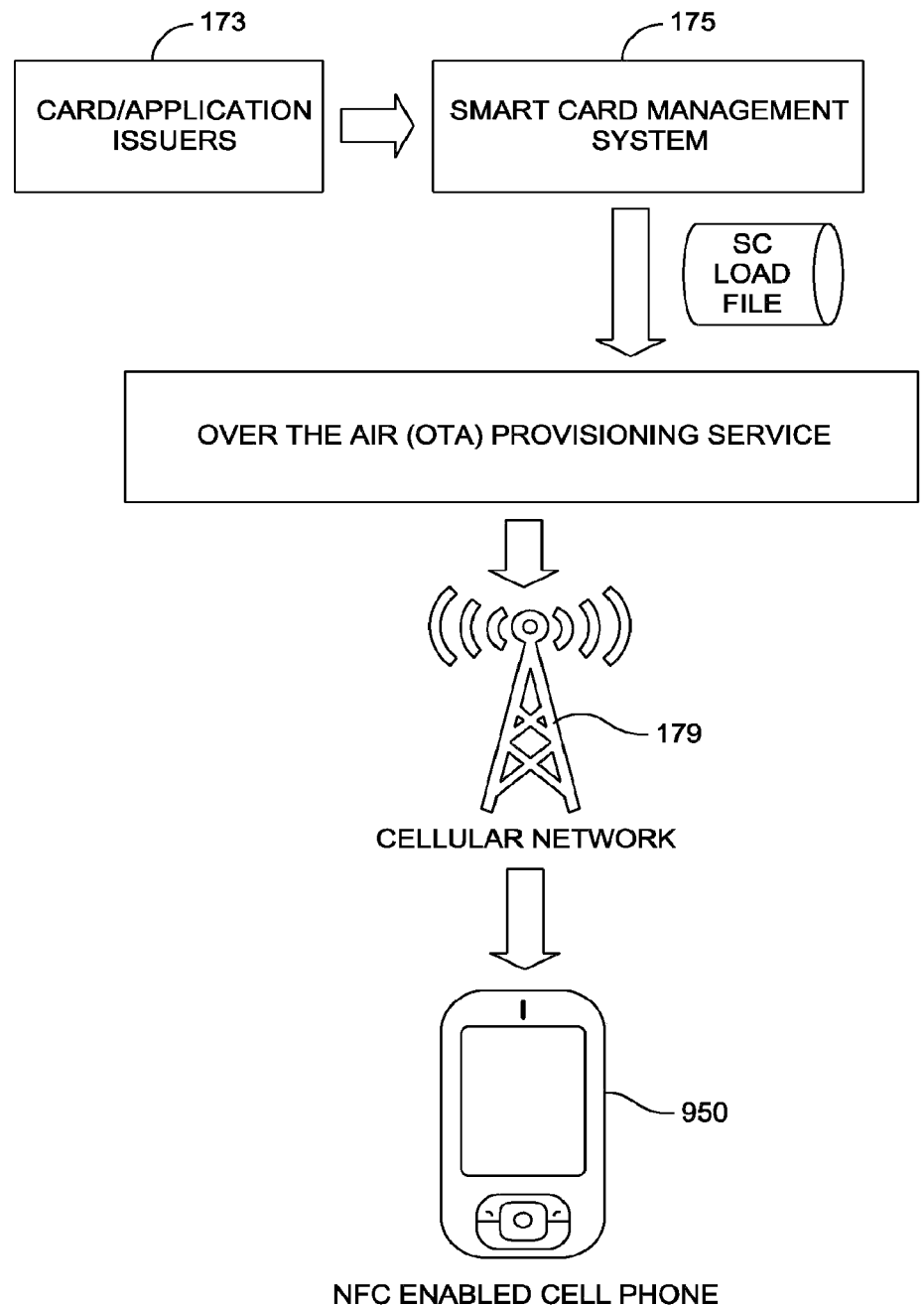
FIG. 18 illustrates a system for programming the cell phone of FIG. 12.

FIG. 18 illustrates a system for programming the cell phone 950 with transaction applications and managing those applications. The system operates in much the same manner as the system shown in FIG. 1 and described above except that the programming occurs over-the-air via a cellular system. Of course, programming could also occur via wireless Internet communications. The system includes Smart Card Managements System 175, which is described above. The issuer 173 (or its agent) takes standard account information and a SCMS system 175 and combines the account information with other data to create a load file that is downloaded to the cell phone 950 via the cellular data network 179 and Over the Air (OTA) Provisioning Service 177, such as the Trusted Service Provider service provided by Venyon of Helsinki, Finland. This service is responsible for, among other things, managing the cellular communications during the download of the Load File. When the mobile phone 950 receives this load file it is routed to the card manager program resident on the phone 950 that controls the installation and activation of the smart card applications on the phone.

Figure 19:
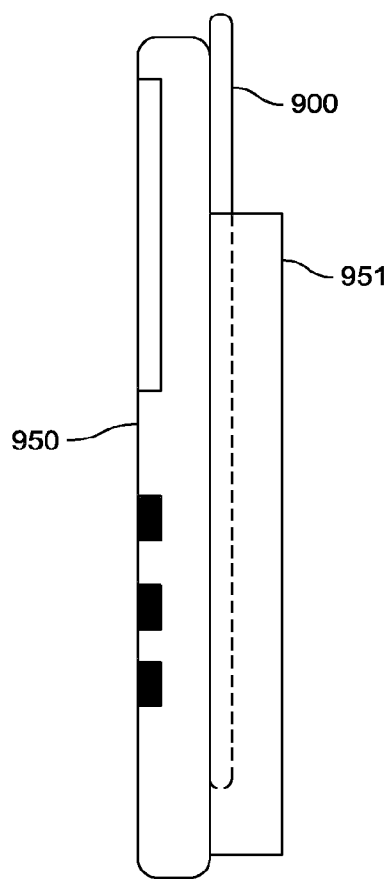
FIG. 19 illustrates an embodiment of the cell phone illustrated in FIG. 12.

FIG. 19 illustrates an option for storing and charging the NFC enabled companion card 900. More specifically, the NFC enabled companion card 900 is stored in a slot or pocket 951 behind the cell phone 950. A connection is provided to couple the cell phone 950 to the NFC enabled companion card 900 so that the internal battery 916 of the NFC enabled companion card 900 can be recharged by the internal battery of cell phone 950.

While the smart card system described herein provides particular advantages when used in connection with financial transactions, the system is not so limited. The smart card system can be used in connection with access to customer records, health records, financial records or other confidential information. As such, the term "transaction" as used herein is not limited to financial transactions but rather more generically refers to the provision of information by way of smart card or magnetic stripe for use in some form of authentication and/or authorization.

Although the invention has been described in terms of exemplary embodiments, it is not limited thereto. Rather, the appended claims should be construed broadly to include other variants and embodiments of the invention that may be made by those skilled in the art without departing from the scope and range of equivalents of the invention.

What is claimed is:

1. A method of conducting a transaction, comprising:
   generating contactless smart card transaction data with a smart card application resident on a personal wireless communication device, the smart card application configured for use in contactless smart card transactions;
   formatting, by the personal wireless communication device, the contactless smart card transaction data for a magnetic stripe transaction;
   communicating magnetic stripe transaction data by near field communications from the personal wireless communication device to a companion card, the magnetic stripe transaction data including the formatted contactless smart card transaction data; and
   receiving the magnetic stripe transaction data with the companion card and controlling a magnetic stripe emulator to emit a magnetic field encoded with the magnetic stripe transaction data, whereby the companion card can be used with a transaction terminal configured to read transaction information encoded on a magnetic stripe as part of a card present transaction.

2. The method of claim 1, further comprising the step of receiving the contactless smart card transaction data with a smart card reader application for receiving transaction data from the smart card application, the smart card reader application being resident on the personal wireless communication device.

3. The method of claim 2, wherein the formatting step comprises using a set of instructions specific to the smart card application to format the contactless smart card transaction data for use in magnetic stripe transactions.

4. The method of claim 3, wherein the personal wireless communication device has a plurality of selectable smart card applications resident thereon and a corresponding plurality of sets of instructions specific to those smart card applications to format the contactless smart card transaction data for use in magnetic stripe transactions.

5. The method of claim 4, further comprising the step of receiving a selection of one of the smart card applications for use in the transaction.

6. The method of claim 1, wherein the contactless smart card transaction data includes dynamic card verification data, wherein dynamic card verification data is included in the magnetic stripe transaction data.

7. The method of claim 1, wherein the personal wireless communication device is a cellular telephone.

8. The method of claim 1, wherein the near field communications are in NFC format.

9. The method of claim 1, further comprising displaying on an electronic display of the companion card information for use in authorizing a card-not-present transaction, the information being received from the personal wireless communication device via near field communications.

10. A method comprising:
    generating contactless smart card transaction data with a contactless smart card application resident on a personal wireless communication device, the contactless smart card application configured for use in contactless smart card transactions;
    receiving the contactless smart card transaction data with a smart card reader application for receiving transaction data from the contactless smart card application, the smart card reader application being resident on the personal wireless communication device; and
    formatting the contactless smart card transaction data for a magnetic stripe transaction using a set of instructions specific to the smart card application, the set of instructions being resident on the personal wireless communication device.

11. The method of claim 10, further comprising communicating the magnetic stripe transaction data to a near field communication module of the personal wireless communication device for communication wirelessly to a companion card, the magnetic stripe transaction data including the formatted contactless smart card transaction data.

12. The method of claim 10, wherein the personal wireless communication device is a cellular telephone.

13. The method of claim 10,
    wherein the smart card application is one of a plurality of smart card applications resident on the personal wireless communication device, and
    wherein the set of instructions is one of a plurality of sets of instructions resident on the personal wireless communication device, each set of instructions being associated with a respective one of the smart card applications.

14. The method of claim 13, the method further comprising the step of receiving a selection of one of the plurality of smart card applications for use in a transaction, and selecting the set of instructions from the plurality of sets of instructions corresponding to the selected smart card application for use in the formatting step.

15. The method of claim 10, wherein the smart card reader application is configured to mimic to the contactless smart card application a contactless smart card acceptance device to receive secure communications with the contactless smart card transaction data from the contactless smart card transaction application.

16. The method of claim 15, wherein the receiving step comprises querying the contactless smart card application to return the contactless smart card transaction data, the method further comprising the step of providing the contactless smart card transaction data to a transaction application comprising the set of instructions specific to the contactless smart card application.

17. The method of claim 15, wherein the contactless smart card transaction data includes a dCVV value and transaction counter data.

18. The method of claim 10, wherein the contactless smart card transaction data includes dynamic card verification data, wherein dynamic card verification data is included in the magnetic stripe transaction data, the formatting step comprising providing the dynamic card verification data in place of a static card verification data in the formatted magnetic stripe transaction data.

19. The method of clam 18, wherein the dynamic card verification data includes a dCVV or CVC3 code for us in a credit card transaction.

20. A portable, personal wireless communication device enabled for cellular communications and near field communications with a similarly enabled companion card, the wireless communication device being programmed with at least one smart card application for use in contactless smart card transactions, wherein the wireless communication device comprises a smart card reader application for querying the contactless smart card application to return contactless smart card transaction data comprising dynamic card verification data, the wireless communication device further configured with a transaction application corresponding to the contactless smart card application configured to format the contactless smart card transaction data, including the dynamic card verification data, for a magnetic stripe transaction and communicate magnetic stripe transaction data by near field communication to the companion card, the magnetic stripe transaction data including the formatted contactless smart card transaction data, including the dynamic card verification data, the dynamic card verification data being provided in place of static card verification data.

* * * * *